United States Patent
Yasukawa et al.

(10) Patent No.: US 11,190,976 B2
(45) Date of Patent: Nov. 30, 2021

(54) USER APPARATUS AND TRANSMISSION METHOD

(71) Applicant: NTT DOCOMO, INC., Tokyo (JP)

(72) Inventors: Shinpei Yasukawa, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 22 days.

(21) Appl. No.: 16/626,691

(22) PCT Filed: Jul. 3, 2017

(86) PCT No.: PCT/JP2017/024413
§ 371 (c)(1),
(2) Date: Dec. 26, 2019

(87) PCT Pub. No.: WO2019/008653
PCT Pub. Date: Jan. 10, 2019

(65) Prior Publication Data
US 2020/0229029 A1    Jul. 16, 2020

(51) Int. Cl.
*H04W 28/04* (2009.01)
*H04L 1/08* (2006.01)
*H04W 92/18* (2009.01)

(52) U.S. Cl.
CPC .............. *H04W 28/04* (2013.01); *H04L 1/08* (2013.01); *H04W 92/18* (2013.01)

(58) Field of Classification Search
CPC ..... H04W 28/04; H04W 92/18; H04W 76/14; H04W 80/02; H04W 4/40; H04W 8/00;
(Continued)

(56) References Cited

U.S. PATENT DOCUMENTS

| 2014/0010108 | A1* | 1/2014 | Tavildar | H04W 8/005 370/254 |
| 2016/0183276 | A1* | 6/2016 | Marinier | H04W 72/02 370/329 |

(Continued)

FOREIGN PATENT DOCUMENTS

| JP | 2016527845 A | 9/2016 |
| WO | 2015163602 A1 | 10/2015 |
| WO | 2015170765 A1 | 11/2015 |

OTHER PUBLICATIONS

3GPP TS 36.213 V14.2.0; "3rd Generation Partnership Project; Technical Specification Group Radio Access Network; Evolved Universal Terrestrial Radio Access (E-UTRA); Physical layer procedures (Release 14)" Mar. 2017 (454 pages).

(Continued)

*Primary Examiner* — Anh Vu H Ly
*Assistant Examiner* — Abdullahi Ahmed
(74) *Attorney, Agent, or Firm* — Osha Bergman Watanabe & Burton LLP

(57) ABSTRACT

A user apparatus in a radio communication system supporting a D2D technology, includes a message generating unit configured to generate a message including a first segment and a second segment; and a message transmitting unit configured to transmit, multiple times, the message within a predetermined period, wherein information reported by a plurality of the first segments transmitted within the predetermined period by the message transmitting unit, is not changed within the predetermined period.

12 Claims, 27 Drawing Sheets

(58) Field of Classification Search
CPC ....... H04L 1/08; H04L 1/1845; H04L 1/1819; H04B 1/713
See application file for complete search history.

(56) References Cited

U.S. PATENT DOCUMENTS

| | | | | |
|---|---|---|---|---|
| 2016/0242021 A1* | 8/2016 | Li | .......................... | H04W 8/005 |
| 2016/0366577 A1* | 12/2016 | Hu | ......................... | H04W 8/005 |
| 2017/0041972 A1* | 2/2017 | Yi | .......................... | H04L 5/0055 |
| 2017/0078866 A1 | 3/2017 | Matsumoto | | |
| 2018/0376474 A1* | 12/2018 | Khoryaev | ............. | H04W 76/14 |
| 2019/0191461 A1* | 6/2019 | Lee | ....................... | H04W 72/04 |

OTHER PUBLICATIONS

3GPP TS 36.300 V14.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)" Jun. 2017 (331 pages).
International Search Report issued in International Application No. PCT/JP2017/024413, dated Sep. 19, 2017 (5 pages).
Written Opinion issued in International Application No. PCT/JP2017/024413; dated Sep. 19, 2017 (4 pages).

\* cited by examiner

USER APPARATUS AND TRANSMISSION METHOD

TECHNICAL FIELD

The present invention relates to a user apparatus in a radio communication system.

BACKGROUND ART

In LTE (Long Term Evolution) and successor systems of LTE (for example, LTE-A (LTE Advanced) and NR (New Radio) (also referred to as 5G)), a D2D (Device to Device) technology in which user apparatuses directly communicate with each other without involving a radio base station, is being studied.

D2D reduces the traffic between the user apparatus and the base station, and enables communication between the user apparatuses even when the base station becomes unable to communicate in the event of a disaster, etc.

D2D is generally classified into D2D discovery (also referred to as D2D detection) for finding other communicable user apparatuses and D2D communication (also referred to as D2D direct communication, inter-terminal direct communication, etc.) for user apparatuses to directly communicate with each other. In the following description, when D2D communication, D2D discovery, etc., are not particularly distinguished, these may be simply referred to as D2D.

Note that in 3GPP (3rd Generation Partnership Project), D2D is referred to as "sidelink"; however, in the present specification, D2D, which is a more general term, is used. However, sidelink is also used as necessary in the description of the embodiment to be described later.

Furthermore, in 3GPP, studies are made to implement V2X (Vehicle to Everything) by extending the above D2D function, and the standardization is being advanced. Here, V2X is a part of ITS (Intelligent Transport Systems), and as illustrated in FIG. 1, V2X is a generic term of V2V (Vehicle to Vehicle) meaning a communication mode performed between vehicles, V2I (Vehicle to Infrastructure) meaning a communication mode performed between a vehicle and a road-side unit (RSU) installed on the roadside, V2N (Vehicle to Nomadic device) meaning a communication mode performed between a vehicle and a mobile terminal of a driver, and V2P (Vehicle to Pedestrian) meaning a communication mode between a vehicle and a mobile terminal of a pedestrian.

In Rel-14 of LTE, standardization relating to several functions of V2X has been made (for example, Non-Patent Literature 1). In this specification, Mode 3 and Mode 4 are defined with respect to resource allocation for V2X communication to the user apparatus. In Mode 3, transmission resources are dynamically allocated by DCI (Downlink Control Information) sent from the base station to the user apparatus. Furthermore, in Mode 3, SPS (Semi Persistent Scheduling) is also possible. In Mode 4, the user apparatus autonomously selects a transmission resource from the resource pool.

CITATION LIST

Non-Patent Literature

[NPTL 1]
3GPP TS 36.213 V14.2.0 (2017-03)
[NPTL 2]
3GPP TS 36.300 V14.3.0 (2017-06)

SUMMARY OF INVENTION

Technical Problem

By the above-described D2D discovery, for example, a user apparatus B, which receives a D2D discovery message transmitted from a certain user apparatus A, can discover the user apparatus A and determine a destination ID of the user apparatus A.

Furthermore, it is considered that the user apparatus B measures the radio quality (for example, path loss) by receiving the D2D discovery message, and performs link adaptation. For example, the user apparatus B can select appropriate transmission parameters (for example, transmission power, MCS, transmission beam) for performing D2D communication with the user apparatus A, by link adaptation.

It is also considered to apply the link adaptation by D2D discovery to V2X. However, in V2X, it is assumed that each user apparatus moves at a high speed, and therefore it is necessary to measure the radio quality by receiving D2D discovery messages in short periods. For this purpose, the user apparatus needs to transmit D2D discovery messages in short periods. Furthermore, for example, in order to measure the path loss on the receiving side, it is necessary to include information on the transmission power of the transmission source, etc., in the D2D discovery message.

However, if the D2D discovery messages including information are transmitted in short periods, there is a first problem that the overhead of radio resources increases. Although it is conceivable to measure the radio quality by using the D2D communication, in this case also, there is the first problem that the overhead of radio resources increases, similar to the case of using the D2D discovery message. The first problem is not limited to V2X; this problem may arise in D2D in general.

Furthermore, in V2X, a use case of transmitting a message such as CAM/BSM (CAM: Cooperative Awareness Message/Basic Safety Message) including the position information of the transmission source user apparatus, is being studied. This use case can be considered as discovery at the application layer. In such a use case, it is assumed that the information to be transmitted in messages is frequently changed (for example, every time a message is transmitted).

However, the conventional D2D discovery message does not assume a use case in which the information to be transmitted may be changed frequently as in the above use case; for example, the resource size is fixed in the conventional D2D discovery message. Therefore, the conventional D2D discovery is not suitable for use cases assumed in V2X. That is, there is a second problem that a message transmission technology suitable for a use case in which information to be transmitted may be frequently changed, is required.

The present invention has been made particularly in view of the second problem, and it is an object of the present invention to provide a technology for enabling messages to be appropriately transmitted and received, even when information, which is transmitted in a message by a user apparatus on the transmitting side, may be frequently changed, in D2D.

Solution to Problem

According to the disclosed technology, a user apparatus in a radio communication system supporting a D2D technology is provided, the user apparatus including a message generating unit configured to generate a message including a first segment and a second segment; and a message transmitting unit configured to transmit, multiple times, the message within a predetermined period, wherein information reported by a plurality of the first segments transmitted within the predetermined period by the message transmitting unit, is not changed within the predetermined period.

Advantageous Effects of Invention

According to the disclosed technology, a technology is provided for enabling messages to be appropriately transmitted and received, even when information, which is transmitted in a message by a user apparatus on the transmitting side, may be frequently changed, in D2D.

DESCRIPTION OF EMBODIMENTS

Hereinafter, embodiments of the present invention will be described with reference to the drawings. Note that the embodiments described below are merely examples, and embodiments to which the present invention is applied are not limited to the following embodiments. For example, the radio communication system according to the present embodiment is assumed to be a system of a method complying with the LTE; however, the present invention is not limited to the LTE, but can be applied to other methods. Note that in the present specification and the claims, "LTE" has a broad meaning including not only communication methods corresponding to releases 8 to 14 of 3GPP, but also communication methods of the fifth generation (5G, NR) of release 15 and beyond.

Furthermore, although the present embodiment is mainly targeted at V2X, the technology according to the present embodiment is not limited to V2X, but is widely applicable to D2D in general. Furthermore, "D2D" includes the meaning of V2X. Furthermore, the term "D2D" is not limited to LTE, but refers to general communication between terminals.

Furthermore, in the following description of the embodiments, the existing D2D discovery defined in releases 12 to 14, etc., of 3GPP will be referred to as "LTE-D2D discovery".

Furthermore, the terms "discovery message" and "discovery signal" are used in the following embodiments 1 and 2; however, messages/signals having the same functions as these may be referred to by names other than these.
(Outline of D2D)

In the present embodiment, D2D is the basic technology, and therefore an outline of D2D defined in LTE will be described first. Note that also with V2X, it is possible to use the technology of D2D described here, and the user apparatus according to the present embodiment can transmit and receive D2D signals according to the technology.

Figure 1:
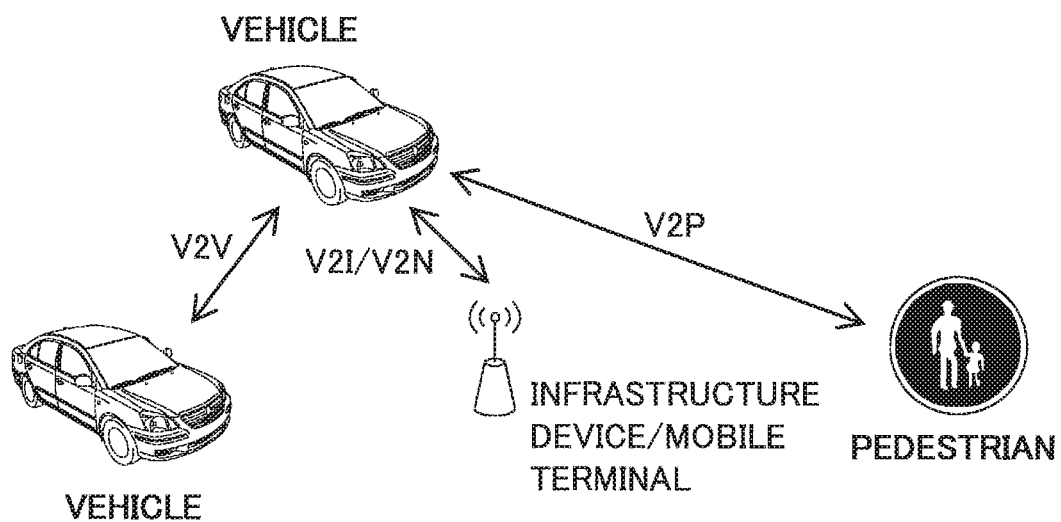
FIG. 1 is a diagram for describing V2X.
Figure 2A:
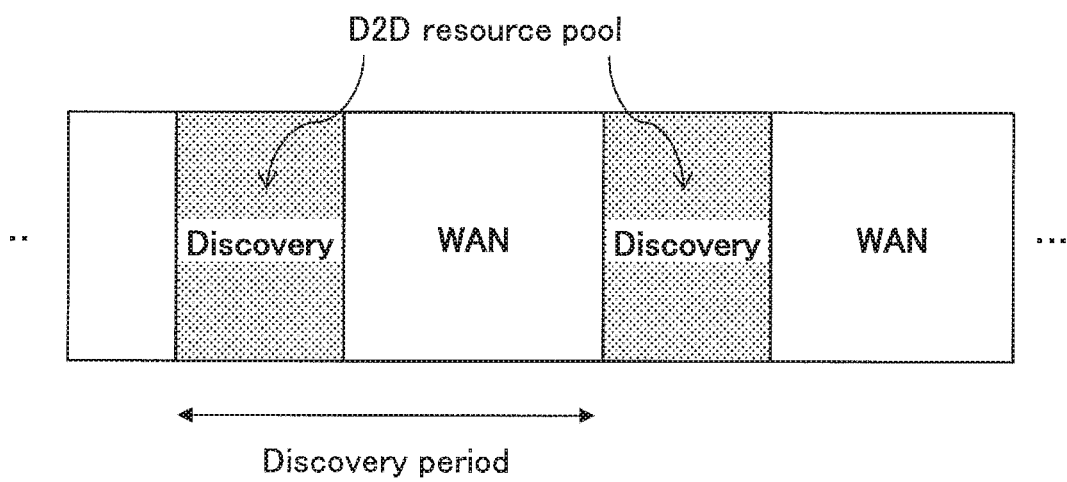
FIG. 2A is a diagram for describing D2D.

As already described, D2D is generally classified into "LTE-D2D Discovery" and "D2D communication". As for "LTE-D2D discovery", as illustrated in FIG. 2A, a resource pool for a discovery message is secured for each discovery period, and the user apparatus transmits a discovery message (discovery signal) in the resource pool. More specifically, there are Type 1 and Type 2b. In Type 1, a user apparatus UE autonomously selects a transmission resource from the resource pool. In Type 2b, a semi-static resource is allocated by higher layer signaling (for example, RRC signal).

Figure 2B:
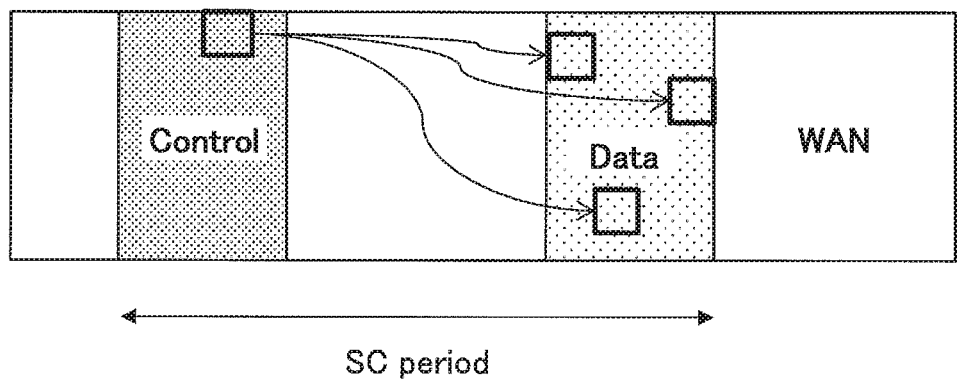
FIG. 2B is a diagram for describing D2D.

As for "D2D communication", as illustrated in FIG. 2B, resource pools for SCI (Sidelink Control Information)/data transmission are periodically secured. The user apparatus on the transmitting side reports, to the receiving side, the data transmission resource (PSSCH resource pool), etc., by SCI, with the resource selected from the Control resource pool (PSCCH resource pool), and transmits the data with the data transmission resource. More specifically, there are Mode 1 and Mode 2 with respect to "D2D communication". In Mode 1, resources are dynamically allocated by (E)PDCCH sent from the base station to the user apparatus. In Mode 2, the user apparatus autonomously selects a transmission resource from the resource pool. The resource pool is reported by SIB or a predefined resource pool is used.

Furthermore, as described above, Rel-14 has Mode 3 and Mode 4 in addition to Mode 1 and Mode 2. In Rel-14, it is possible to transmit SCI and data simultaneously (in one subframe) by resource blocks adjacent to each other in the frequency direction.

In LTE, a channel used for "LTE-D2D Discovery" is referred to as PSDCH (Physical Sidelink Discovery Channel), a channel for transmitting control information such as SCI in "D2D communication" is referred to as PSCCH (Physical Sidelink Control Channel), and a channel for transmitting data is referred to as PSSCH (Physical Sidelink Shared Channel).

Figure 3:
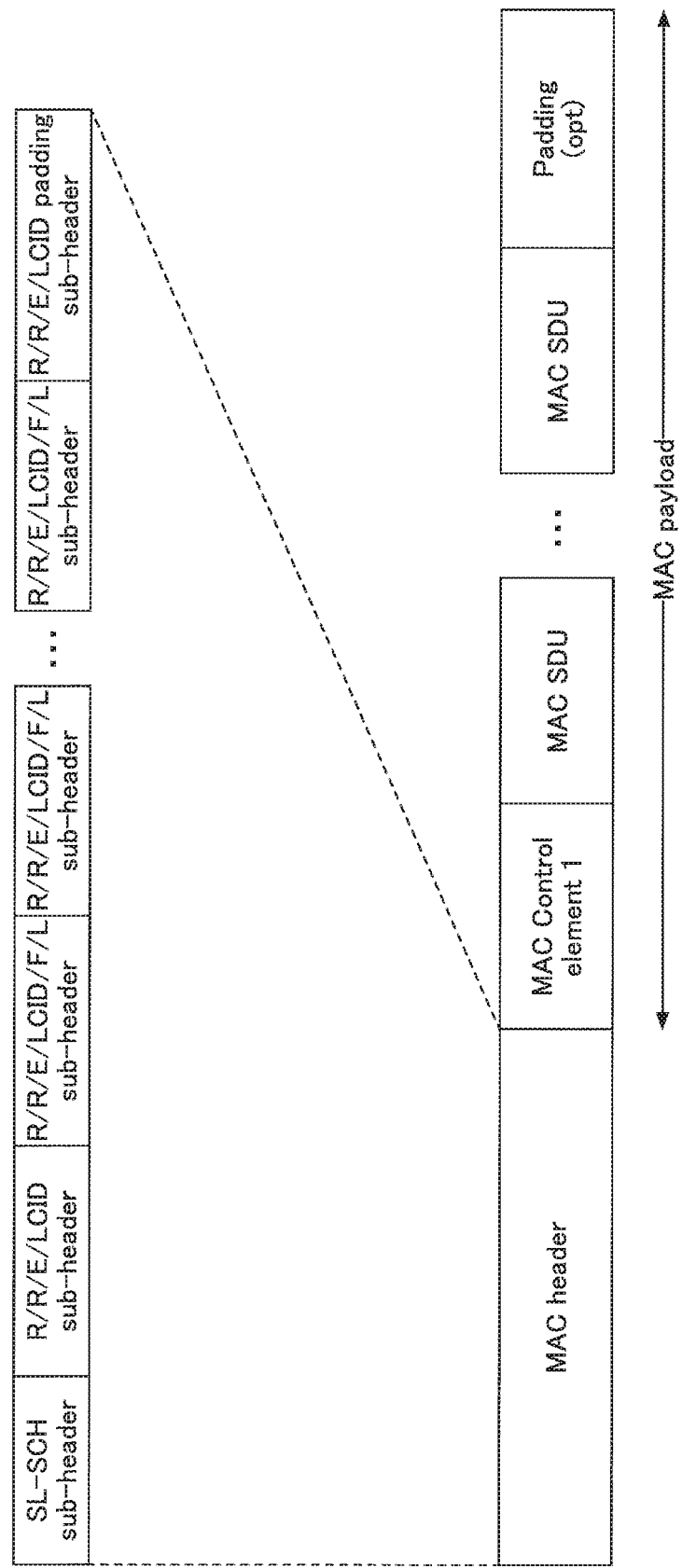
FIG. 3 is a diagram for describing MAC PDU used for D2D communication.

As illustrated in FIG. 3, MAC (Medium Access Control) PDU (Protocol Data Unit) used in D2D is composed of at least a MAC header, a MAC Control element, a MAC SDU (Service Data Unit), and Padding. The MAC PDU may include other information. The MAC header is composed of one SL-SCH (Sidelink Shared Channel) subheader and one or more MAC PDU subheaders.

Figure 4:
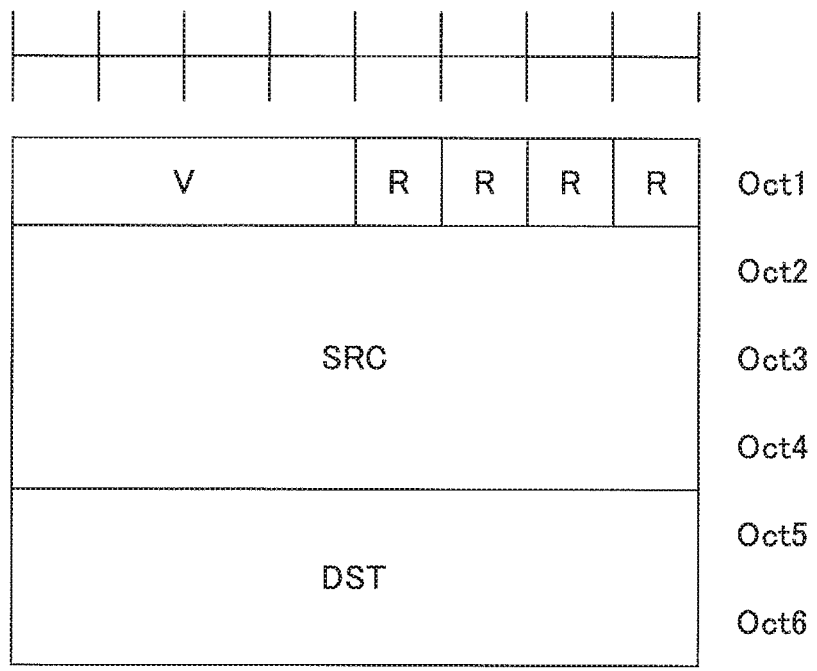
FIG. 4 is a diagram for describing a format of an SL-SCH subheader.

As illustrated in FIG. 4, the SL-SCH subheader is composed of MAC PDU format version (V), transmission source information (SRC), transmission destination information (DST), and reserved bits (R), etc. V is allocated to the beginning of the SL-SCH subheader and indicates a MAC PDU format version used by the user apparatus. In the transmission source information, information relating to the transmission source is set. In the transmission source information, an identifier relating to ProSe UE ID may be set. In the transmission destination information, information relating to the transmission destination is set. In the transmission destination information, information relating to the ProSe Layer-2 Group ID of the transmission destination may be set.

Figure 5:
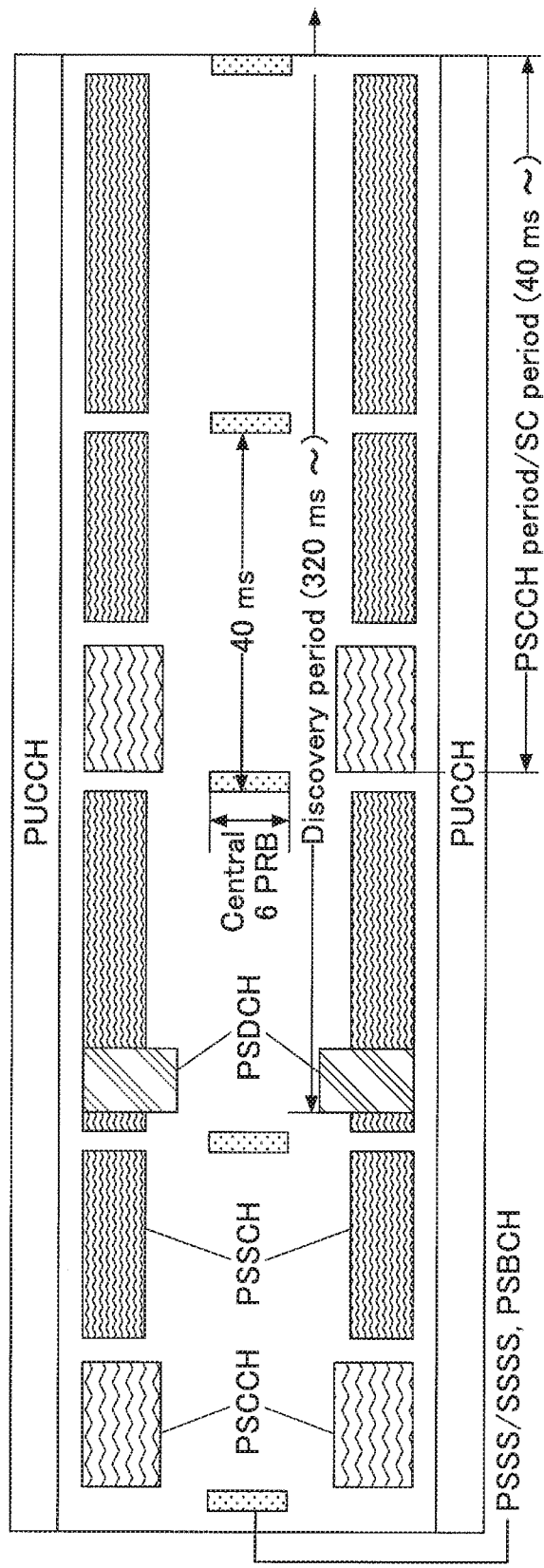
FIG. 5 is a diagram for describing an example of a channel structure used in D2D.

An example of the channel structure of D2D is illustrated in FIG. 5. As illustrated in FIG. 5, resource pools of PSCCH and resource pools of PSSCH used for "D2D communication" are allocated. Furthermore, resource pools of PSDCH used for "LTE-D2D discovery" are allocated in periods longer than the periods of the channels of "D2D communication".

Furthermore, PSSS (Primary Sidelink Synchronization Signal) and SSSS (Secondary Sidelink Synchronization Signal) are used as synchronization signals for D2D. Furthermore, for example, PSBCH (Physical Sidelink Broadcast Channel) that transmits broadcast information including the D2D system band, the frame number, and resource configuration information, etc., is used for an outside coverage operation. PSSS/SSSS and PSBCH are transmitted in one subframe.

Figure 6A:
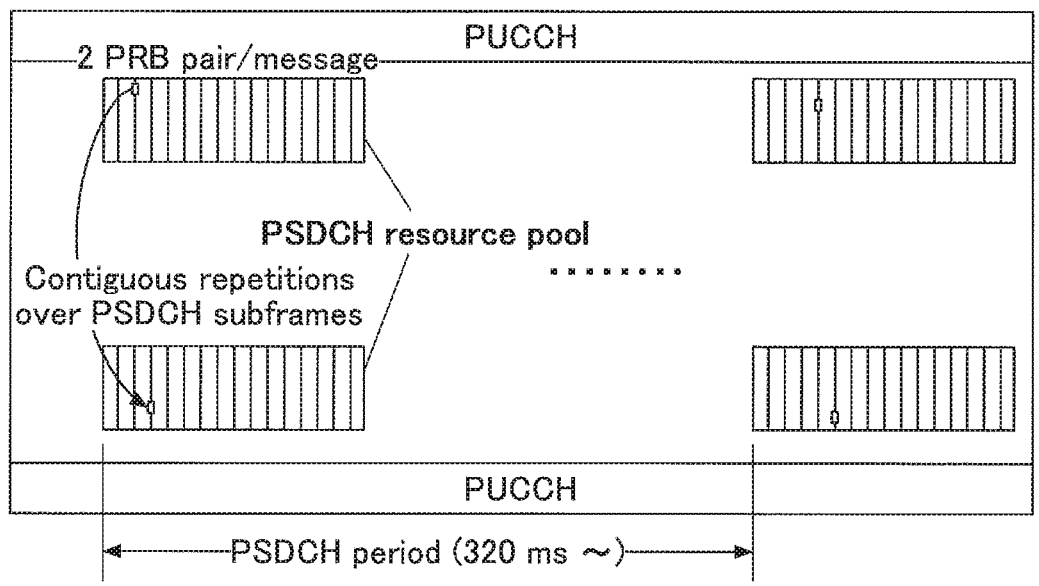
FIG. 6A is a diagram illustrating an example of a structure of PSDCH.
Figure 6B:
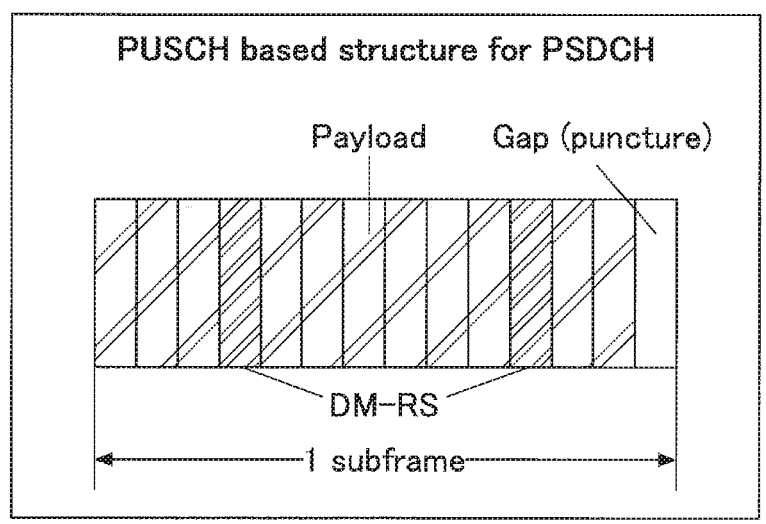
FIG. 6B is a diagram illustrating an example of the structure of PSDCH.

FIG. 6A illustrates an example of a resource pool of PSDCH used in "LTE-D2D discovery". The resource pool is set by the bitmap of the subframe, and therefore the image of the resource pool becomes an image as illustrated in FIG. 6A. The same applies to resource pools of other channels. Furthermore, in PSDCH, transmission is repeatedly performed (repetition) while performing frequency hopping. The number of repetitions can be set, for example, from 0 to 4. Furthermore, as illustrated in FIG. 6B, the PSDCH has a PUSCH base structure and has a structure in which a DM-RS (demodulation reference signal) is inserted.

Figure 7A:
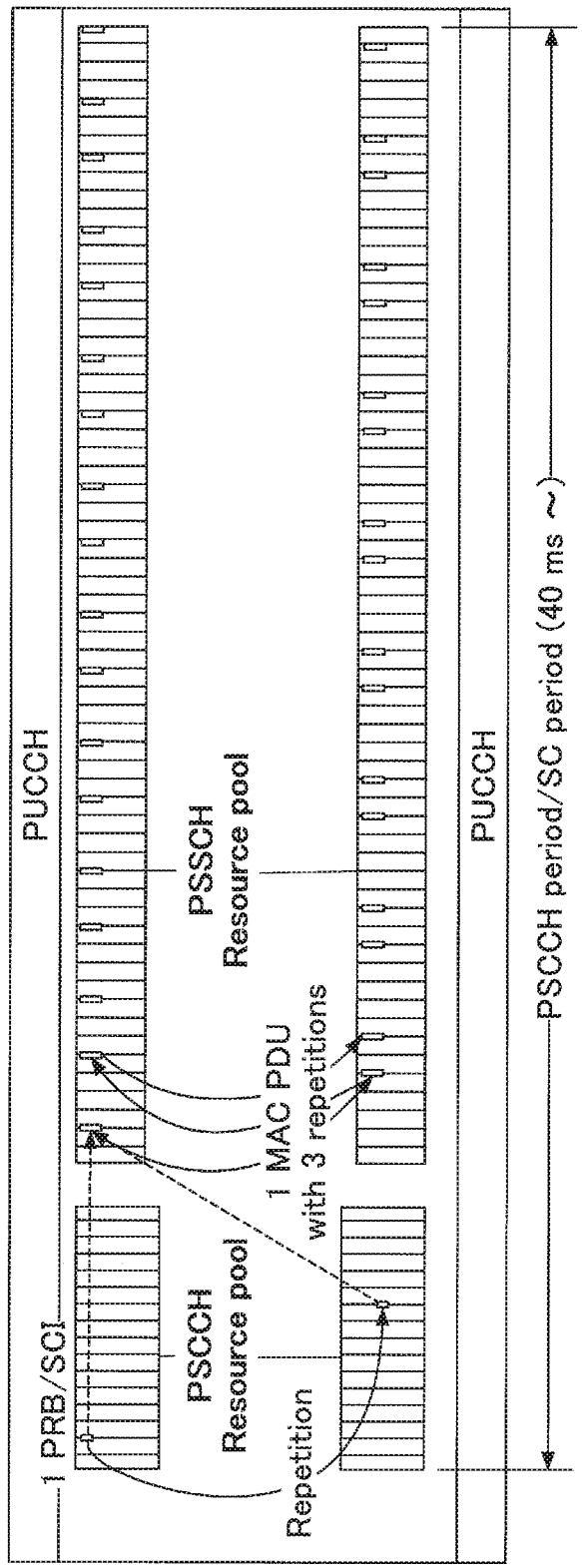
FIG. 7A is a diagram illustrating an example of the structure of PSCCH and PSSCH.
Figure 7B:
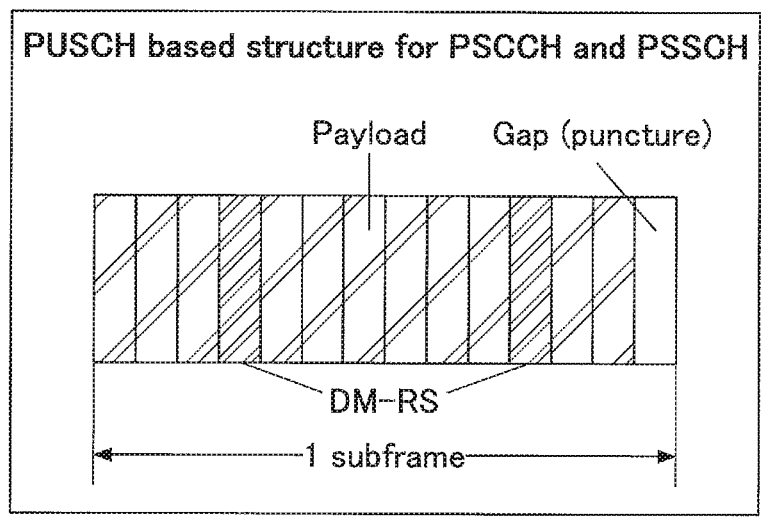
FIG. 7B is a diagram illustrating an example of the structure of PSCCH and PSSCH.

FIG. 7A illustrates an example of a resource pool of PSCCH and PSSCH used for "D2D communication". In the example illustrated in FIG. 7A, in PSCCH, transmission is repeatedly performed twice including the first time, while frequency hopping. In PSSCH, transmission is repeatedly performed four times including the first time, while frequency hopping. Furthermore, as illustrated in FIG. 7B, PSCCH and PSSCH have a PUSCH base structure, that is a structure in which DMRS is inserted.

Figure 8A:
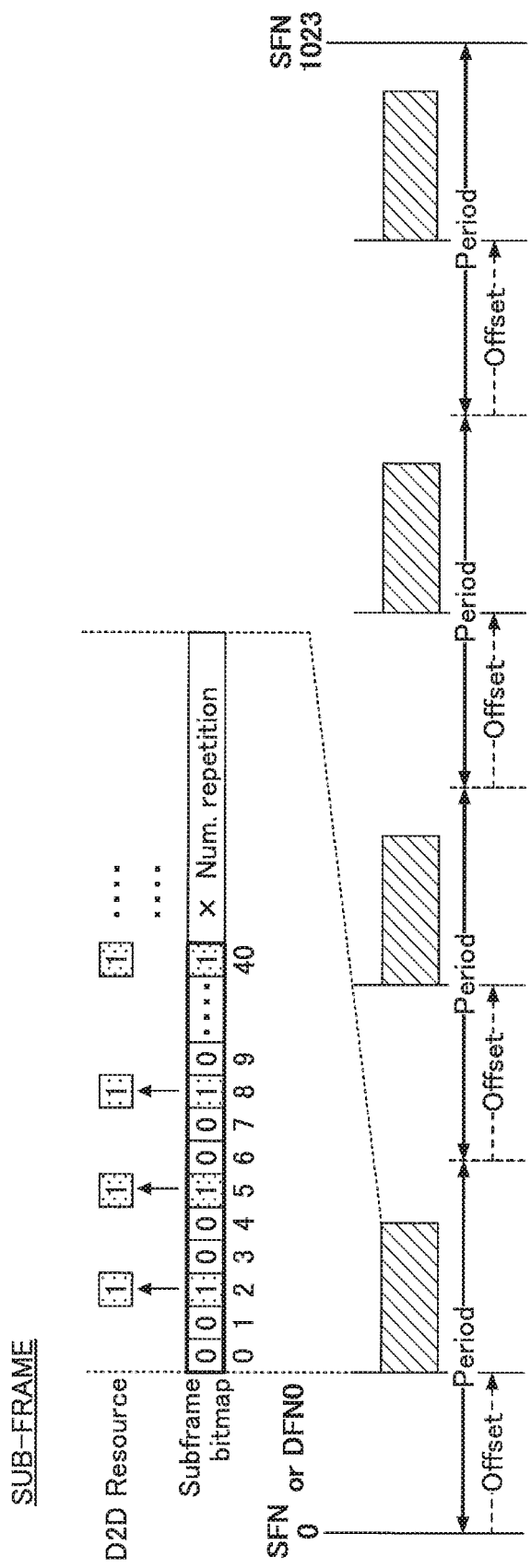
FIG. 8A is a diagram illustrating a resource pool configuration.
Figure 8B:
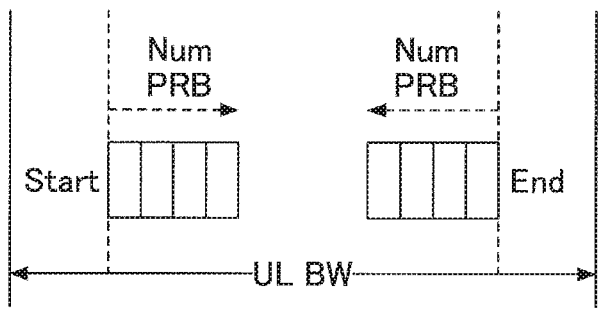
FIG. 8B is a diagram illustrating a resource pool configuration.

FIGS. 8A and 8B illustrate examples of resource pool configurations in PSCCH, PSDCH, and PSSCH. As illustrated in FIG. 8A, in the time direction, a resource pool is represented as a subframe bitmap. Furthermore, the bitmap is repeated as many times as num.repetition. Furthermore, an offset indicating the start position in each period is specified. Note that the bitmap is also referred to as T-RPT (Time-Resource Pattern).

In the frequency direction, contiguous allocation and dis-contiguous allocation are possible. In the example of FIG. 8B, as illustrated, the start PRB, the end PRB, and the number of PRBs (numPRB) are specified.

(System Configuration)

Figure 9:
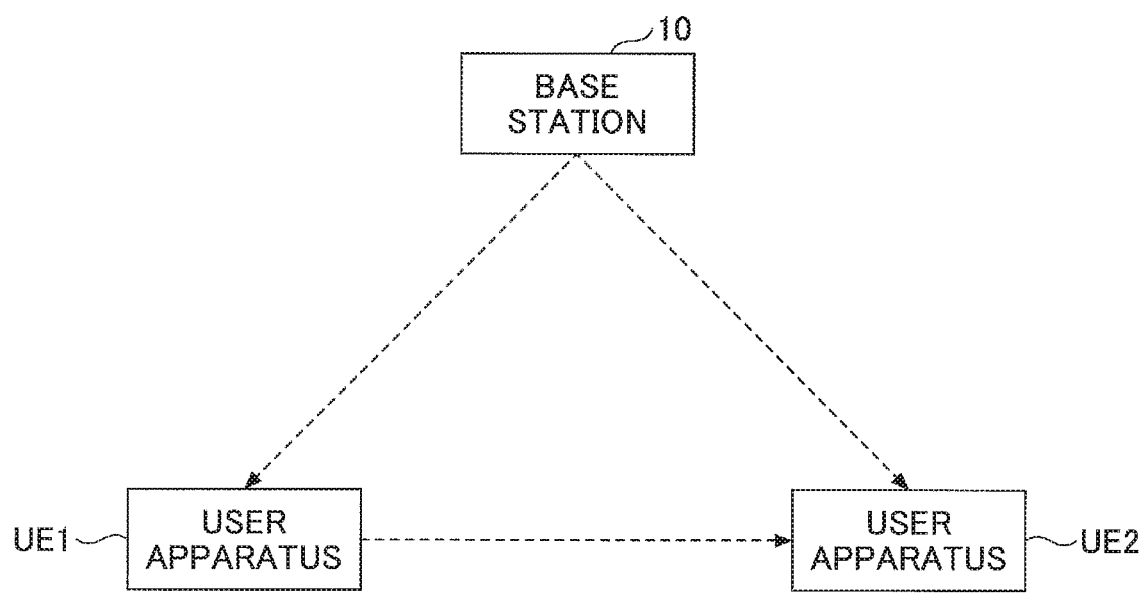
FIG. 9 is a diagram illustrating a configuration example of a radio communication system according to an embodiment.

FIG. 9 is a diagram illustrating a configuration example of the radio communication system according to the present embodiment. As illustrated in FIG. 9, the radio communication system according to the present embodiment includes a base station 10, a user apparatus UE1, and a user apparatus UE2. In FIG. 9, the user apparatus UE1 is intended for the transmitting side of the discovery message/discovery signal, and the user apparatus UE2 is intended for the receiving side of the discovery message/discovery signal; however, both the user apparatus UE1 and the user apparatus UE2 have a transmitting function and a receiving function. Hereinafter, when not particularly distinguishing between the user apparatus UE1 and the user apparatus UE2, the user apparatus is simply described as "user apparatus UE". Furthermore, the user apparatus UE may be described as "UE" in some cases.

The user apparatus UE1 and the user apparatus UE2 illustrated in FIG. 9 respectively have functions of cellular communication as the user apparatus UE in LTE (in addition to existing LTE, LTE including meaning of 5G, NR, the same applies hereinafter), and have a D2D function including signal transmission and reception in the channels described above. Furthermore, the user apparatus UE1 and the user apparatus UE2 have a function of executing the operations described in the present embodiment.

Furthermore, the user apparatus UE may be any apparatus having the function of the D2D. For example, the user apparatus UE may be a vehicle, a terminal held by a pedestrian, and an RSU (a UE type RSU having a UE function), etc.

Furthermore, the base station 10 has a function of cellular communication as the base station 10 in LTE, and a function (NW assist function) for enabling communication of the user apparatus UE according to the present embodiment. Furthermore, the base station 10 may be an RSU (eNB type RSU having the function of eNB).

Furthermore, the signal waveform used for D2D by the user apparatus UE may be CP-OFDM (same as in DL in LTE), SC-FDMA (same as in UL in LTE), or other signal waveforms. In the present embodiment, it is assumed that the same SC-FDMA as in the UL of the LTE, is used in the D2D. Similar to the UL of the LTE, the time direction resources in the D2D are represented by symbols, slots, subframes, etc., and the frequency direction resources are represented by subcarriers, subbands, etc. However, in the present embodiment, symbols, slots, subframes, subcarriers, subbands, etc., need not be the same as UL of LTE.

(Basic Operation Example)

Figure 10:
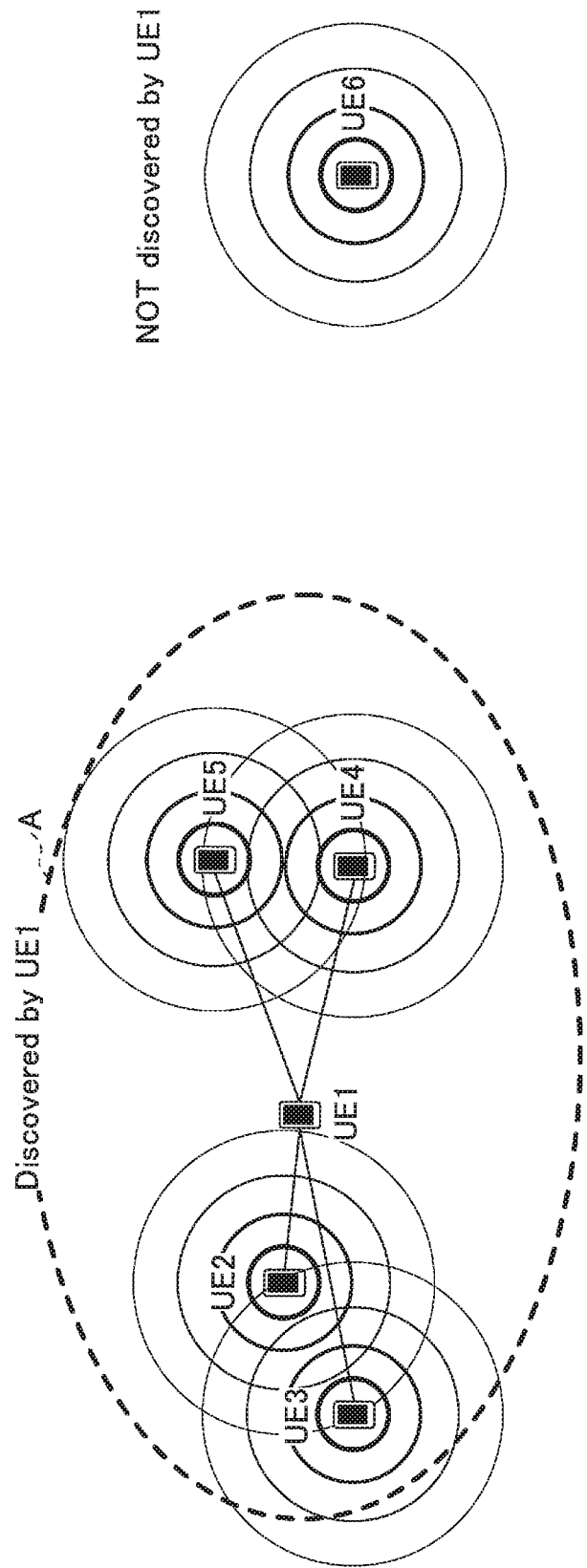
FIG. 10 is a diagram for describing a basic operation according to the embodiment.

FIG. 10 is a diagram for describing a basic operation example relating to discovery between user apparatus UEs according to the present embodiment (including the embodiments 1 and 2). The "discovery message" used in the description is the discovery message of the embodiment 1 or the embodiment 2, and the "discovery signal" is the discovery signal of the embodiment 1.

FIG. 10 illustrates a status where UE1 to UE6 are present. UE1 to UE5 are located in neighboring areas indicated by A, and UE6 is located at a position distant from UE1 to UE5.

Each of UE2 to UE6 transmits a discovery message and/or a discovery signal. UE1 receives the discovery message and/or the discovery signal transmitted from UE2 to UE5 and identifies the IDs (transmission source IDs) of UE2 to UE5. Furthermore, as an example, the discovery message and/or the discovery signal includes the transmission power information of the transmission source, and UE1 can measure the path loss (an example of radio quality) of UE2 to UE5, by measuring the reception power of the discovery message and/or the discovery signal transmitted from UE2 to UE5.

For example, when UE1 detects that all of the path losses of UE2 to UE5 are small (when it is detected that UE2 to UE5 are in a near range), UE1 can determine to decrease the transmission power/MCS for performing transmission in D2D communication with respect to UE2 to UE5. Furthermore, when the CSI of a specific UE that is the destination can be identified, the UE1 can select an appropriate transmission beam. Note that in order to implement reliable discovery, it is desirable that the discovery range is sufficiently larger than the D2D communication range.

Note that the UE1 cannot receive the discovery message and/or the discovery signal transmitted from the UE6, and therefore UE1 does not discover UE6.

Hereinafter, the embodiments 1 and 2 will be described as embodiments relating to discovery according to the present embodiment.

Embodiment 1

<Outline of Embodiment 1>

In the embodiment 1, hybrid discovery composed of signal type discovery and message type discovery is introduced.

In the embodiment 1, a signal transmitted by signal type discovery is referred to as a discovery signal, and a message transmitted by message type discovery is referred to as a discovery message.

The discovery signal transmitted in the signal type discovery is a physical signal that does not include a message, similar to a reference signal or a synchronization signal. However, the discovery signal is not limited to a physical signal, and the discovery signal may be a message having a small payload. The discovery message transmitted by message type discovery is a message including information such as an AS parameter, UE-ID, position information, etc. In the embodiment 1, the channel for transmitting the discovery message is not particularly limited; however, for example, the channel of D2D communication may be used. Furthermore, a channel of LTE-D2D discovery may be used. Furthermore, a newly defined channel may be used.

Basically, the user apparatus UE transmits both a discovery message and a discovery signal. The transmission period of discovery signals is independent of the transmission period of discovery messages. "Independent of" means, for example, that the transmission period of discovery signals and the transmission period of discovery messages are independently determined. For example, the transmission period of discovery signals is shorter than the transmission period of discovery messages. In this case, for example, the transmission period of discovery signals is 10 ms, and the transmission period of discovery messages is 200 ms.

Furthermore, the transmission time (the time length of the resource used for one transmission, transmission duration) and the bandwidth (the frequency width of the resource used for one transmission) of discovery signals may be different from the transmission time and the bandwidth of discovery messages. For example, the user apparatus UE transmits the discovery signal over a wide bandwidth by using one OFDM symbol (hereinafter, symbol) or a plurality of symbols.

The discovery signal does not include a message, and therefore the discovery signal can be transmitted in a short time. Therefore, even if the transmission period of the discovery signals is shortened independently of the transmission period of discovery messages, the increase in overhead can be kept small.

The discovery message transmitted from the user apparatus UE1 on the transmitting side includes, for example, information on resources used by the user apparatus UE1 for transmitting discovery signals. Accordingly, the user apparatus UE2 on the receiving side receives the discovery message transmitted from the user apparatus UE1, thereby identifying the resource of the discovery signal transmitted from the user apparatus UE1, and based on the resource, the user apparatus UE2 can receive the discovery signal transmitted from the user apparatus UE1. Accordingly, for example, the user apparatus UE2 can identify the path loss between the user apparatus UE1 and the user apparatus UE2.

The information on the mapping between the discovery message and the discovery signal transmitted by a certain user apparatus UE, such as the above resource information, may be provided to the user apparatus UE by the base station 10. For example, the base station 10 transmits the information of the resource of the discovery signal transmitted by the user apparatus UE1 to the user apparatus UE2, so that the user apparatus UE2 existing within the coverage of the base station 10, can receive the discovery signal transmitted from the user apparatus UE1 without receiving the discovery message transmitted from the user apparatus UE1.

Note that the information transmitted from the base station 10 to the user apparatus UE in the NW assist is not limited to the information on the discovery message/discovery signal. For example, the base station 10 may transmit, to the user apparatus UE, mapping information between any two, or between any three or four of the discovery message, the discovery signal, the control channel, and the data channel.

<Details of Discovery Message>

The user apparatus UE1 that is the transmission source may include, in the discovery message to be transmitted, one or more transmission parameters and/or one or more reception parameters used by the user apparatus UE1. The transmission parameter is a parameter used for signal transmission by the user apparatus UE1, and the reception parameter is a parameter used for signal reception by the user apparatus UE1. The transmission parameter corresponds to the reception parameter on the receiving side.

These parameters are parameters used in Access Stratum's protocol (PDCP, RLC, MAC, PHY, etc.) in the PC5 interface (Non-Patent Literature 2), for example, and are referred to as AS (Access Stratum) parameters.

As AS parameters, for example, there are L1-ID (ID of layer 1) and L2-ID (ID of layer 2).

Furthermore, as the AS parameters for message type discovery, for example, there is transmission power or transmission power density. Furthermore, as the AS parameters for signal type discovery, for example, there are the following:

Frequency used for transmission or reception
Resources and configurations (for example, time/frequency resource hopping pattern, periodicity, sequence) used for transmitting or receiving discovery signals
Transmission power, transmission power density, transmission power offset relative to the transmission power of the discovery message.

One or any plurality of or all of the plurality of AS parameters described above are included in the discovery message.

In hybrid discovery, the AS parameter of the discovery signal transmitted by a discovery message from the user apparatus UE1 on the transmitting side (for example, the configuration used by the user apparatus UE1 for discovery signal transmission, etc.) is useful for the user apparatus UE2 on the receiving side of the discovery signal, and the AS parameter can be used to receive (measure) the discovery signal transmitted from the user apparatus UE1.

The discovery message transmitted from the user apparatus UE1 may include the AS parameter of the PSCCH to be transmitted (or received) by the user apparatus UE1 and/or the AS parameter of the PSSCH to be transmitted (or received) by the user apparatus UE1. In this case, the user apparatus UE2 receiving the discovery message can use the AS parameter of the PSCCH and/or the AS parameter of the PSSCH for transmission/reception of PSCCH/PSSCH. In this way blind detection can be reduced. Furthermore, the performance of link adaptation/beam forming can be improved. Furthermore, collision of resources can be reduced.

As AS parameters for D2D communication included in the discovery message, for example, there are the following parameters:

A frequency for transmission or a frequency for reception
Power gap between channels, power gap between signals
As AS parameters for D2D communication included in a discovery message, for PSCCH, for example, there are the following parameters:
Scrambling parameters
Transmission power or transmission power density
MCS
Resource size
Beam pattern, beam ID
Candidate resources (for example, resource pool).
Time during which reception may not be performed (D2D gap)
Reference signal configuration (for demodulation, for phase compensation, etc.)

As AS parameters for D2D communication included in a discovery message, for PSSCH, for example, there are the following parameters:
Transmission power or transmission power density
MCS
Beam pattern, beam ID
Candidate resources (for example, resource pool).
Time during which reception may not be performed (D2D gap)
Reference signal configuration (for demodulation, for phase compensation, etc.)

One or any plurality of or all of the AS parameters described above are included in the discovery message.

Hereinafter, an example of transmitting/receiving a discovery signal and a discovery message without performing NW assist will be described as the embodiment 1-1, and an example of performing NW assist will be described as the embodiment 1-2.

Embodiment 1-1

In a case where the user apparatus UE1, etc., transmits a discovery signal and a discovery message, the user apparatus UE2 on the receiving side, which receives the discovery signal and the discovery message, needs to identify that the discovery signal and the discovery message have been transmitted from the same user apparatus.

Therefore, in the embodiment 1-1, the discovery signal and the discovery message are associated with each other as in option 1, option 2, or option 3 described below.

<Discovery Signal/Discovery Message Association: Option 1>

Figure 11A:
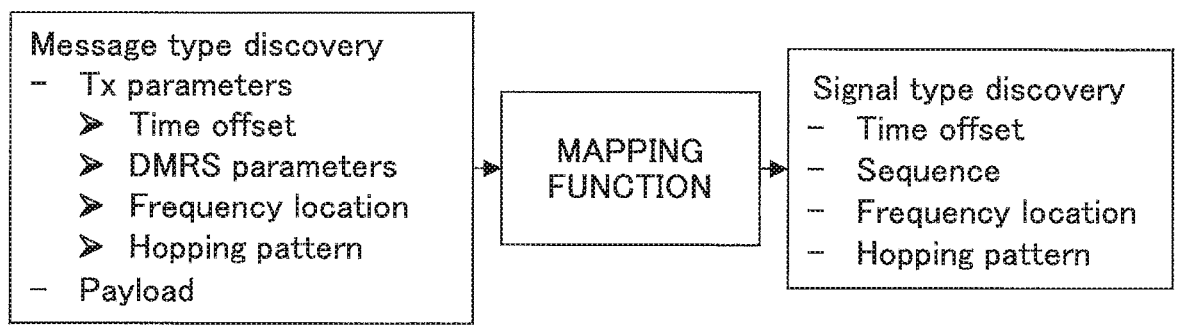
FIG. 11A is a diagram illustrating an example of mapping between message type discovery and signal type discovery.

In option 1, as illustrated in FIG. 11A, the transmission/reception parameters of a discovery signal are derived from the transmission parameters of a discovery message and/or the payload of the discovery message. Note that the transmission/reception parameter means a parameter used by the transmitting side for transmission and a parameter used by the receiving side for reception, which may be the same.

As illustrated in FIG. 11A, there are time offset, DMRS parameter, frequency position, hopping pattern, etc., as the transmission parameters of the discovery message used for deriving the transmission/reception parameters of the discovery signal.

For example, the user apparatus UE1 on the transmitting side transmits a discovery message by using the transmission parameters selected by the user apparatus UE1. Furthermore, according to a predetermined rule (mapping function in FIG. 11A), transmission parameters of a discovery signal are derived from transmission parameters of a discovery message, and a discovery signal is transmitted by using the transmission parameters.

The user apparatus UE2 that receives the discovery message estimates the transmission parameters of the received discovery message. Alternatively, the user apparatus UE1 may include the transmission parameters of the discovery message in the payload of the discovery message, and the user apparatus UE2 may acquire the transmission parameters from the payload.

From the transmission parameters of the received discovery message, the user apparatus UE2 derives the reception parameters of the discovery signal according to the predetermined rule, and receives the discovery signal by using the reception parameters. The user apparatus UE2 identifies the discovery signal received by using the reception parameters, as the discovery signal transmitted from the user apparatus UE1 that is the transmission source of the discovery message from which the reception parameters have been derived.

In option 1, compared with option 2, there is an advantage that the transmitting side can flexibly select the transmission parameters of the discovery message.

The discovery message and the discovery signal do not need to be one to one, and may correspond to 1:N. For example, a configuration may be considered in which a plurality of discovery signals with respect to a certain discovery message, are used for transmission by different transmission beams and/or reception beams and/or different panels (antenna groups, antenna ports). That is, to a certain discovery message, a plurality of discovery signals, which are transmitted by different transmission beams and/or different reception beams and/or different panels, are associated.

Furthermore, for example, when a discovery signal in a certain transmission beam is applied, the user apparatus UE2 on the receiving side can perform discovery according to the communication range in the case where the transmission beam is applied (the discovery range becomes wide). At this time, the discovery message may be transmitted by a predetermined port and/or transmission beam index. The discovery message may be repeatedly transmitted in order to compensate for the coverage difference between the discovery message and the discovery signal depending on the presence or absence of a beam. The number of repetitions may be a predetermined number of times. Furthermore, a periodic switching pattern in terms of time (beam switching pattern) may be applied to the transmission beam of the discovery signal. Accordingly, a beam diversity effect is obtained. Furthermore, by reporting the beam switching pattern of the discovery signal to the user apparatus UE2 on the receiving side with the discovery message, or by transmitting the discovery signal with a predetermined beam switching pattern, the user apparatus UE2 on the receiving side can also estimate the channel quality for each transmission beam.

Information on the transmission beam and/or the transmission port of the discovery signal can be reported by the discovery message. Furthermore, in a mode in which information on the transmission beam and/or the transmission port of the discovery signal is not reported by a discovery message, it may be regarded that the configuration relating to the transmission beam forming of the discovery signal such as the transmission beam index and/or the transmission port, is the same as that of the discovery message, or the association of transmission beams between the discovery message and the discovery signal may be defined in advance.

<Discovery Signal/Discovery Message Association: Option 2>

Figure 11B:
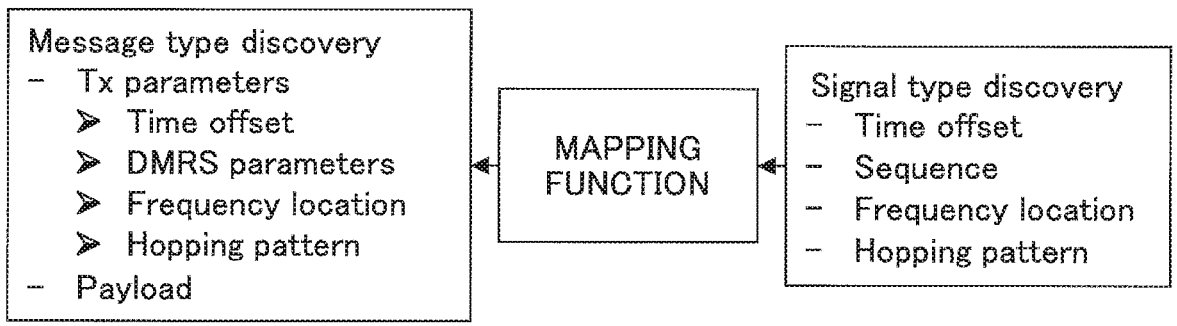
FIG. 11B is a diagram illustrating an example of mapping between message type discovery and signal type discovery.

In option 2, as illustrated in FIG. 11B, the transmission/reception parameters of the discovery message are derived from the transmission parameters of the discovery signal.

As illustrated in FIG. 11B, there are time offset, sequence, frequency position, hopping pattern, etc., as transmission parameters of a discovery signal used for deriving transmission/reception parameters of a discovery message.

For example, the user apparatus UE1 on the transmitting side transmits a discovery signal by using the transmission parameters selected by the user apparatus UE1. Furthermore, according to a predetermined rule (mapping function in FIG. 11B), transmission parameters of a discovery message are derived from transmission parameters of a discovery signal, and a discovery message is transmitted by using the transmission parameters.

The user apparatus UE2 that receives the discovery signal estimates the transmission parameters of the received discovery signal.

From the transmission parameters of the received discovery signal, the user apparatus UE2 derives the reception parameters of the discovery message according to the predetermined rule, and receives the discovery message by using the reception parameters. The user apparatus UE2 identifies the discovery message received using the reception parameters as the discovery message transmitted from the user apparatus UE1 that is the transmission source of the discovery signal from which the reception parameters have been derived. Furthermore, when the discovery message includes the ID of the user apparatus UE1 that is the transmission source, the user apparatus UE2 can identify, based on the ID, that the transmission source of the discovery signal is the user apparatus UE1 having the corresponding ID.

Option 2 has the advantage of being able to quickly detect the discovery signal compared to option 1.

<Discovery Signal/Discovery Message Association: Option 3>

In option 3, the transmission parameters and/or reception parameters of the discovery message and the transmission parameters and/or reception parameters of the discovery signal associated with the discovery message, are set (configured) or preset (pre-configured) in the user apparatus UE1.

<Selection of Transmission Resource>

Regarding the transmission resource of the discovery message, for example, the resource pool is set (configured) or preset (pre-configured) in the user apparatus UE1. With regard to setting (configuring) in the present embodiment, for example, it is assumed that a configuration is performed by the base station 10 for the user apparatus UE by RRC signaling, etc. Furthermore, with regard to presetting (pre-configuring) in the present embodiment, for example, it is assumed that settings are made in advance without the user apparatus UE receiving settings from the base station 10. Hereinafter, setting (configuring) or presetting (pre-configuring) is described as (pre) setting.

The user apparatus UE1 transmits a discovery message by using the resource selected from the resource pool. A resource pool for reception (which may be the same as the resource pool for transmission) is also set for the user apparatus UE2 on the receiving side. The resource pool for reception may not be set for the user apparatus UE2 on the receiving side.

Furthermore, regarding the transmission resource of the discovery signal, for example, a resource pool is (pre) set in the user apparatus UE1. The user apparatus UE1 transmits a discovery signal by using a resource selected from the resource pool. A resource pool for reception (which may be the same as the resource pool for transmission) is also set for the user apparatus UE2 on the receiving side. The resource pool for reception may not be set for the user apparatus UE2 on the receiving side.

For example, the transmission resource pool of the discovery signal is defined such that the discovery signal is transmitted by one symbol or a plurality of symbols in a certain slot.

In both cases of the discovery message and the discovery signal, there are options 1 and 2 as methods by which the user apparatus UE1 selects a transmission resource from the resource pool. Which one of option 1 or option 2 is to be executed, may be determined by an instruction from the base station 10, or the one that is to be executed may be preset in the user apparatus UE1.

In option 1, the user apparatus UE1 randomly selects a resource from the resource pool for the transmission of the discovery message/discovery signal.

In option 2, the user apparatus UE1 makes a sensing-based resource selection. In this case, for example, the user apparatus UE1 selects resources satisfying the following conditions 1 and 2, as candidate resources.

Condition 1: RSRP or RSSI is less than the predefined (or (pre) set) threshold.

Condition 2: In a slot (or symbol) that is the time resource of the resource satisfying condition 1, RSRP or RSSI in a frequency resource other than the frequency resource of the resource satisfying condition 1, is lower than a threshold value determined in advance (or (pre) set).

Then, the user apparatus UE1 transmits a discovery message/discovery signal using resources randomly selected from the resources satisfying the conditions 1 and 2.

Furthermore, the user apparatus UE1 may make a sensing-based resource selection according to the method defined in Non-Patent Literature 1.

For example, there may be a plurality of transmission settings of a discovery message and a discovery signal, from the viewpoint of the user apparatus UE1 on the transmitting side, and the user apparatus UE1 on the transmitting side may transmit a discovery signal and a discovery message based on any setting, and may select an unused resource (setting) based on a sensing result, a measurement result, or a result of decoding a discovery message, etc.

<Multiplexing Method>

As methods of multiplexing a discovery signal and a discovery message, there are options 1 and 2 as follows.

<Multiplexing Method: Option 1>

Figure 12:
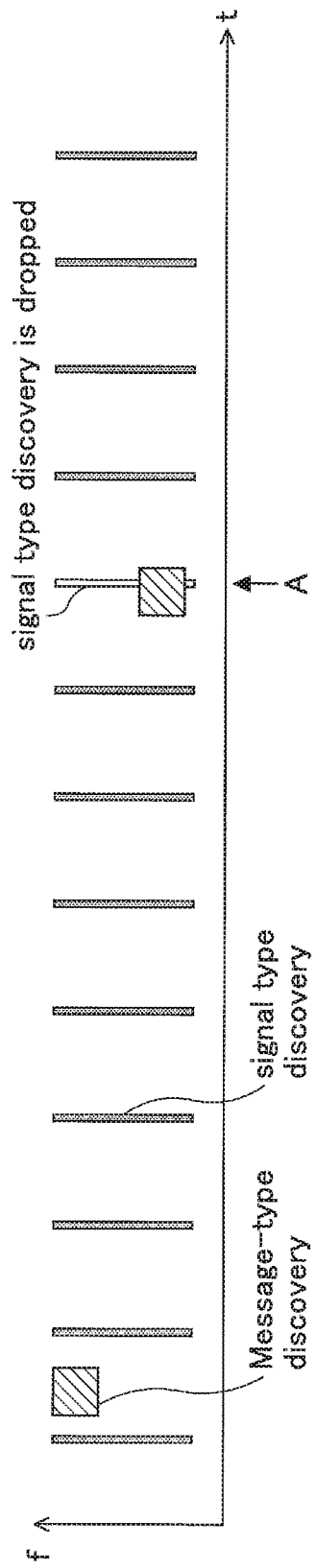
FIG. 12 is a diagram illustrating an example (option 1) of a method of multiplexing a discovery message and a discovery signal.

Option 1 will be described with reference to FIG. 12. As illustrated in FIG. 12, in this example, the discovery signal is transmitted in periods shorter than the transmission periods of discovery messages. Furthermore, the discovery signal is transmitted by a transmission bandwidth wider than the transmission bandwidth of the discovery message.

In the time resource indicated by A in FIG. 12, a part of the resource of the discovery signal overlaps a part of the resource of the discovery message. When the resources overlap in this way, the user apparatus UE1 drops the transmission of the discovery signal. That is, the user apparatus UE1 does not transmit a discovery signal in this time resource.

<Multiplexing Method: Option 2>

Next, option 2 will be described. In option 2, a single symbol or a plurality of symbols in a discovery message are not transmitted. The single symbol or the plurality of symbols are used for transmitting a discovery signal. Hereinafter, options 2-1 and 2-2 will be described.

<Multiplexing Method: Option 2-1>

Figure 13:
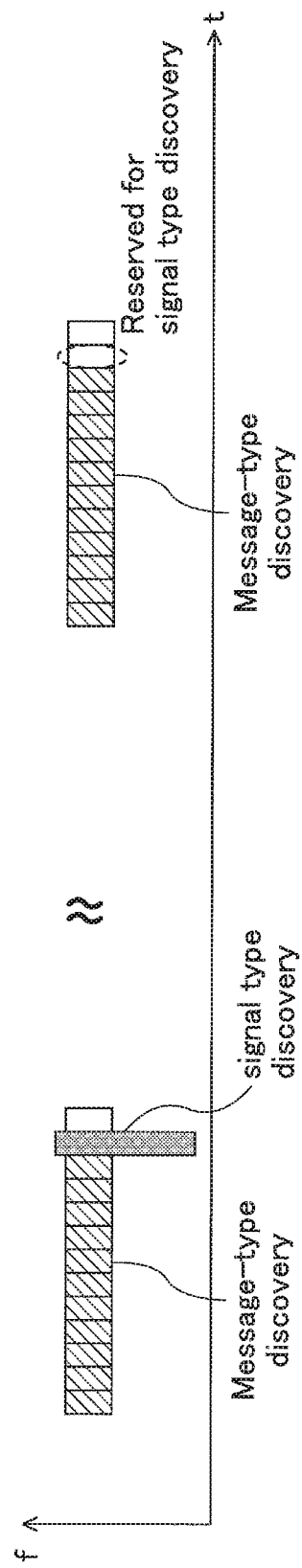
FIG. 13 is a diagram illustrating an example (option 2-1) of a method of multiplexing a discovery message and a discovery signal.

In option 2-1, one symbol or a plurality of symbols in a discovery message are not always transmitted. FIG. 13 illustrates an example. As illustrated in FIG. 13, in this example, the last one symbol in the discovery message is not always transmitted, regardless of whether the discovery signal is transmitted. Note that the blank at the trailing end of the discovery message in FIG. 13 indicates a GAP in the slot (or subframe).

<Multiplexing Method: Option 2-2>

In option 2-2, when the discovery signal overlaps the discovery message, the overlapping single symbol or a plurality of symbols are not used for transmitting the discovery message.

Figure 14:
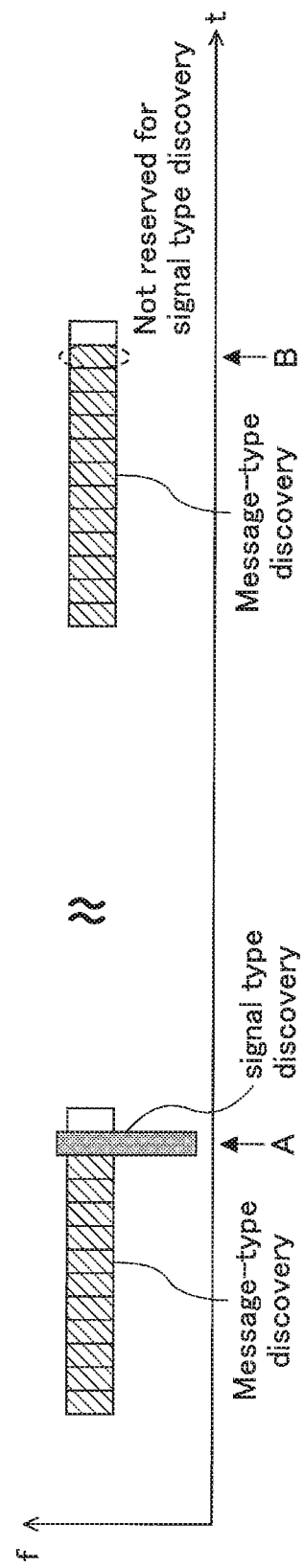
FIG. 14 is a diagram illustrating an example (option 2-2) of a method of multiplexing a discovery message and a discovery signal.

An example is illustrated in FIG. 14. In the example of FIG. 14, in the time resource indicated by A, a resource of one symbol in the discovery message overlaps the resource of the discovery signal. In this case, the symbol is not used for transmitting the discovery message. On the other hand, in the symbol at the time position indicated by B, the discovery signal is not transmitted, and therefore the symbol is used for transmitting the discovery message.

<Regarding Cross Carrier Transmission>

Discovery messages and discovery signals may be transmitted at different frequencies (carriers). For example, the user apparatus UE1 transmits the discovery message at a low frequency, and transmits the discovery signal at a frequency higher than the frequency of the discovery message. The high frequency may be, for example, a frequency used in D2D communication.

Furthermore, the discovery message and the discovery signal may be transmitted by different RATs. For example, the user apparatus UE1 transmits the discovery message by the LTE sidelink and transmits the discovery signal by the NR sidelink.

<Regarding Measurement>

In a case where both message type discovery and signal type discovery are (pre) set for the user apparatus UE1 on the transmitting side and/or the user apparatus UE2 on the receiving side, for example, the user apparatus UE2 on the receiving side performs measurement by a discovery signal.

Alternatively, the user apparatus UE2 on the receiving side performs measurements on both the discovery signal and the discovery message, for example, and calculates and uses the average of the measurement result of the discovery signal and the measurement result of the discovery message. Note that even in the case of performing measurements on both the discovery signal and the discovery message, with regard to the usage of the measurement result, only one of the measurement results may be used. Furthermore, for the measurement by the discovery message, the DMRS in the discovery message is used.

Furthermore, in a case where only message type discovery is (pre) set for the user apparatus UE1 on the transmitting side and/or the user apparatus UE2 on the receiving side, the user apparatus UE2 on the receiving side uses the DMRS in the discovery message to perform measurements.

In a case where only signal type discovery is (pre) set for the user apparatus UE1 on the transmitting side and/or the user apparatus UE2 on the receiving side, the user apparatus UE2 on the receiving side performs measurements by the discovery signal.

Embodiment 1-2

Next, an example in which NW assist is performed will be described as the embodiment 1-2. Even in the case of performing NW assist, the embodiment 1-1 can be applied to the operation in which the user apparatus UE1 transmits a discovery signal/a discovery message, and the operation in which the user apparatus UE2 receives (or measures) the discovery signal/discovery message.

Figure 15:
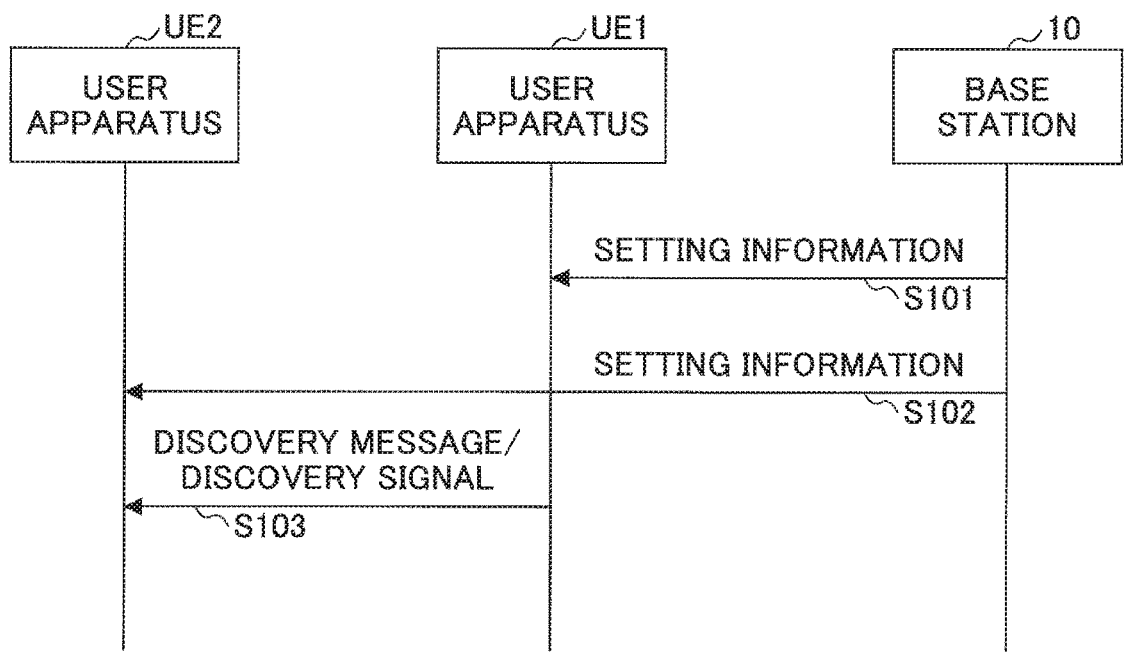
FIG. 15 is a diagram for describing NW assist.

FIG. 15 is a diagram for describing the operation in the embodiment 1-2. As illustrated in FIG. 15, in step S101, the base station 10 transmits configuration information to the user apparatus UE1. In step S102, the base station 10 transmits configuration information to the user apparatus UE2. Transmission of the configuration information in steps S101 and S102 may be performed by SIB common to the UEs, by UE specific higher layer signaling (RRC message), by a MAC signal, or by DCI.

In step S103, the user apparatus UE1 transmits a discovery message and/or a discovery signal based on the configuration information received in step S101, and the user apparatus UE2 receives the discovery message and/or the discovery signal transmitted from the user apparatus UE1 based on the configuration information received in step S102.

The configuration information received by the user apparatus UE2 on the receiving side in the above-described step S102 is, for example, parameters (for example, time/frequency resources, periods, sequences), etc., necessary for detecting the discovery signal. More specifically, there are options 1 and 2 as follows.

Option 1) In option 1, the configuration information received by the user apparatus UE2 is a list of candidate parameter sets. In this case, for example, the user apparatus UE2 attempts to detect the discovery signal by using each candidate parameter set in the list, and detects the discovery signal. Subsequently, for example, a discovery message corresponding to the detected discovery signal is received by using the mapping function described in the embodiment 1-1, and the transmission source of the discovery signal and the discovery message is identified by an ID included in the discovery message.

Option 2) In option 2, the configuration information received by the user apparatus UE2 is a list of "transmission source IDs and parameter sets corresponding to the transmission source IDs". In this case, the user apparatus UE2 attempts to detect a discovery signal by using each parameter set in the list, and detects the discovery signal. The user apparatus UE2 identifies the transmission source ID corresponding to the parameter set used when the discovery signal has been detected, as the transmission source ID of the discovery signal.

In step S101, the configuration information received by the user apparatus UE1 on the transmitting side is, for example, the transmission configuration (for example, time/frequency resources, periods, hopping parameters, etc.) of the discovery signal and/or the discovery message.

In the above example, the base station 10 reports, to the UE side, both the configuration information for receiving the discovery message and/or the discovery signal and the configuration information for transmitting the discovery message and/or the discovery signal; however, this is only an example. The base station 10 may report, to the UE side, either the configuration information for receiving the discovery message and/or the discovery signal or the configuration information for transmitting the discovery message and/or the discovery signal.

(Regarding Usage of Discovery in Embodiment 1)

The user apparatus UE can estimate, for example, the user apparatus UE that is the destination of the D2D communication, by discovery. For example, the user apparatus UE can determine the destination UE based on the measurement result (path loss) of the discovery message and/or the discovery signal that is received and/or the location information of the transmission source UE of the discovery message and/or the discovery signal. For example, the user apparatus UE can determine, as the destination, the UE that has the smallest path loss among the UEs in its own heading direction.

Furthermore, the user apparatus UE2 performing transmission, such as D2D communication, based on the discovery message and/or discovery signal that is received, may determine the transmission parameters based on the maximum path loss, among the path losses in a group of user apparatuses UEs to be destinations that are identified from the discovery message and/or the discovery signal that is received. Accordingly, it is possible to appropriately perform data transmission (group cast, multicast, etc.) to the above group.

Note that when the user apparatus UE2 that has performed transmission by D2D communication, etc., receives a NACK for the MAC PDU from a certain UE, the user apparatus UE2 may adjust the transmission parameters in order to improve the reliability.

As described above, in the embodiment 1, the transmission period of the discovery message and the transmission period of the discovery signal are independent of each other, and discovery signals of short periods and discovery messages of long periods are used, and therefore it is possible for the user apparatus UE to appropriately measure the radio quality while avoiding an increase in the overhead of the radio resources.

Embodiment 2

Next, the embodiment 2 will be described. A message transmitted by discovery according to the embodiment 2 is referred to as a discovery message. The discovery message described in the embodiment 2 may be used as a discovery message of the message type discovery of the embodiment 1. That is, the embodiment 1 and the embodiment 2 can be implemented in combination. Furthermore, the discovery message of the message type discovery of the embodiment 1 may be different from the discovery message described in the embodiment 2.

<Outline of Embodiment 2>

Figure 16:
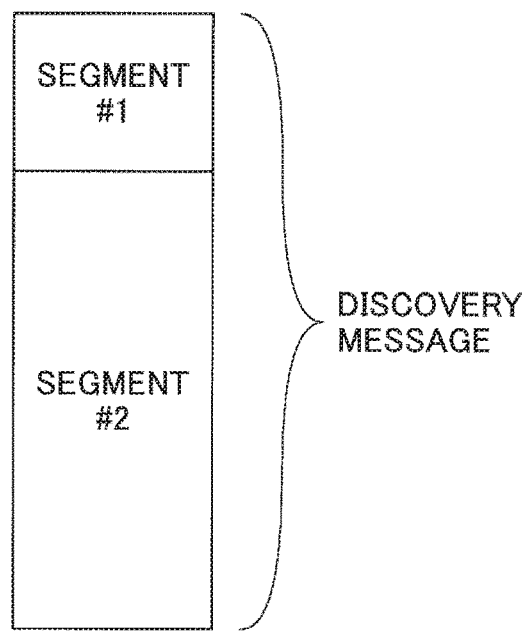
FIG. 16 is a diagram for describing the outline according to embodiment 2.

The discovery message in the embodiment 2 has two or more parts, and each part is separately encoded. However, it is not essential to encode the parts separately. FIG. 16 illustrates an example where the discovery message includes two parts. As illustrated in FIG. 16, this discovery message includes segments #1 and #2.

At least one part (for example, segment #1) in the discovery message is transmitted with a fixed payload size by using a certain resource, and the content of this part does not change within a certain time period. However, the redundancy version and beam forming can be changed within the period.

The user apparatus UE1 on the transmitting side repeatedly transmits discovery messages in a predetermined time/frequency resource pattern, for example, so that the user apparatus UE2 on the receiving side can identify repeated transmissions from the same user apparatus UE1 and receive the discovery messages by HARQ soft combining of segment #1. Furthermore, the user apparatus UE1 on the transmitting side may determine the time/frequency resource pattern of the discovery message by itself, transmit the information of the determined time/frequency resource pattern by a sidelink control channel (that is, by SCI), and transmit a discovery message by the time/frequency resource pattern.

Hereinafter, the contents of the discovery message will be described in more detail by taking a discovery message including segment #1 and segment #2 as illustrated in FIG. 16, as an example.

<Content Example of Discovery Message>

Segment #1 includes AS parameters that are not frequently updated. Examples of the AS parameters are as follows. Segment #1 includes one or any plurality of or all of the following parameters:

Transmission parameters for transmitting a discovery message, and/or transmission parameters for transmitting control information in D2D communication, and/or transmission parameters for data transmission in D2D communication (transmission parameters are parameters used on the transmitting side; for example, transmission power, transmission carrier, MCS, resource size, reference signal configuration, etc.).

Reception parameters for receiving discovery messages, and/or reception parameters for receiving control information, and/or reception parameters for data reception (a reception parameter means a parameter used by the transmitting side of the discovery message when receiving information from another UE; for example, a reception beam pattern/index, and a reception carrier, etc. Furthermore, the reception parameter may be a parameter used by the receiving side of the discovery message when receiving information).

Segment #2 includes information that may be updated each time a discovery message is transmitted. The information is, for example, one or any plurality of or all of the position, the speed, the heading direction, the acceleration, etc., of the user apparatus UE1 transmitting the discovery message. Furthermore, the AS parameters may be included in segment #2.

By multiplexing segment #1 and segment #2 to obtain a discovery message, the user apparatus UE2 on the receiving side can identify that the two segments have been transmitted from the same user apparatus UE.

For example, the user apparatus UE2 that performs transmission in D2D communication by receiving the discovery message, can determine the destination UE based on the position of the UE detected in segment #2 and adjust transmission parameters when transmitting control information/data to the destination UE based on the AS parameters of segment #1.

In the embodiment 2, there are types 1 and 2 described below as transmission types.

<Type 1>

In type 1, the user apparatus UE1 transmits a discovery message without transmitting control information for receiving a discovery message on the receiving side. For example, the discovery message is transmitted according to the time/frequency resource set, MCS, a hopping pattern, etc., which have been (pre) configured or predefined. The user apparatus UE2 on the receiving side performs blind detection of the discovery message.

<Type 2>

In Type 2, the user apparatus UE1 transmits a discovery message together with control information for receiving a discovery message on the receiving side. That is, transmission is performed by the same method as D2D communication. The control information includes, for example, an indication of the time/frequency resource and an indication of MCS. Before the process of receiving the discovery message, the user apparatus UE2 on the receiving side decodes the control information and performs a reception process (demodulation, decoding) by using the control information.

The control information in type 2 may be referred to as scheduling information. The control information in type 2 may be used for the scheduling of only segment #2 or may be used for the scheduling of segment #1 and segment #2 or may be used for the scheduling of only segment #1.

<Regarding Channels to be Used>

As an example, segment #1 is transmitted on a control channel (that is, PSCCH) and segment #2 is transmitted on the data channel (that is, PSCCH).

For example, in addition to the SCI format for data scheduling, an SCI format for discovery message scheduling may be defined. Furthermore, for example, the SCI (segment #1) of SCI format for discovery message scheduling may not include parameters relating to link adaptation of data (for example, MCS, RI, PMI). Furthermore, it may be assumed that the data resource size (for example, the resource size of segment #2) is fixed.

As described above, information (indication) indicating that the SCI is segment #1 may be included in the SCI by using the free area in the SCI that does not include parameters relating to the link adaptation. Alternatively, the user apparatus UE2 on the receiving side may determine that the SCI that does not include the parameter relating to the link adaptation, indicates segment #1.

The flag in the SCI, the payload size of the SCI, or the CRC mask may be used to identify the type of SCI (for discovery messages or for D2D communication).

<Example of Procedure for Transmitting Discovery Message>

Next, an example of a procedure of transmitting a discovery message executed by the user apparatus UE1 on the transmitting side will be described with reference to FIGS. 17 to 19. The transmission processes illustrated in FIGS. 17 to 19 are processes executed by a transmission unit 101 in the user apparatus UE1 to be described later.

Figure 17:
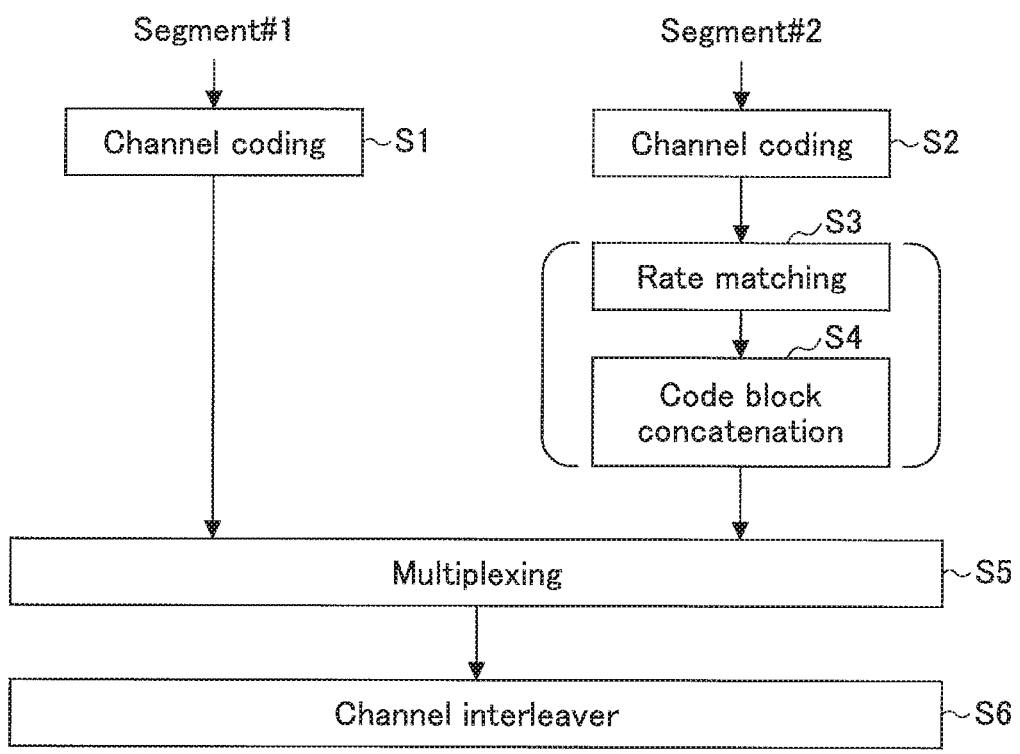
FIG. 17 is a diagram illustrating an example (type 1) of a procedure of transmitting a discovery message.

FIG. 17 illustrates an example of Type 1. As illustrated in FIG. 17, channel coding is performed on the information of segment #1 (the bit string to which the CRC is added) (step S1). At the same time, channel coding is performed on the information of segment #2 (the bit string to which the CRC is added) (step S2), and rate matching and code block concatenation are performed on the channel coded information (steps S3, S4). Note that steps S3 and S4 may not be executed. The information of segment #1 processed in step S1 and the information of segment #2 processed in steps S1 to S4 are multiplexed (step S5), channel interleaved (step S6), and a discovery message is generated. Subsequently, by performing scrambling, modulation, and mapping to resources, etc., the discovery message is transmitted from the antenna as a radio signal. Note that channel interleaving may not be performed.

In the example illustrated in FIG. 17, on the receiving side, segment #1 is detected regardless of whether segment #2 is detected.

Figure 18:
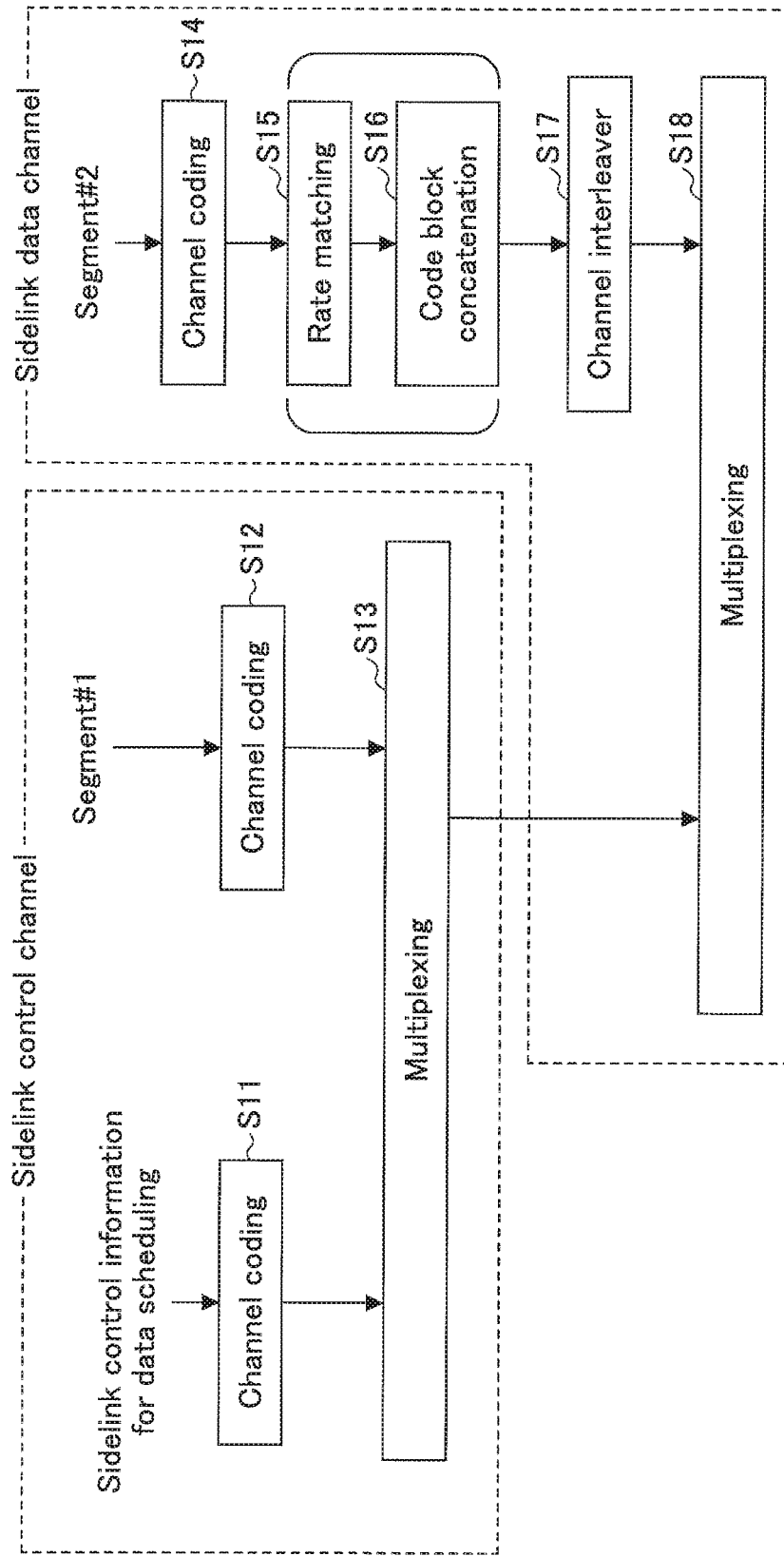
FIG. 18 is a diagram illustrating an example (type 2) of a procedure of transmitting a discovery message.
Figure 19:
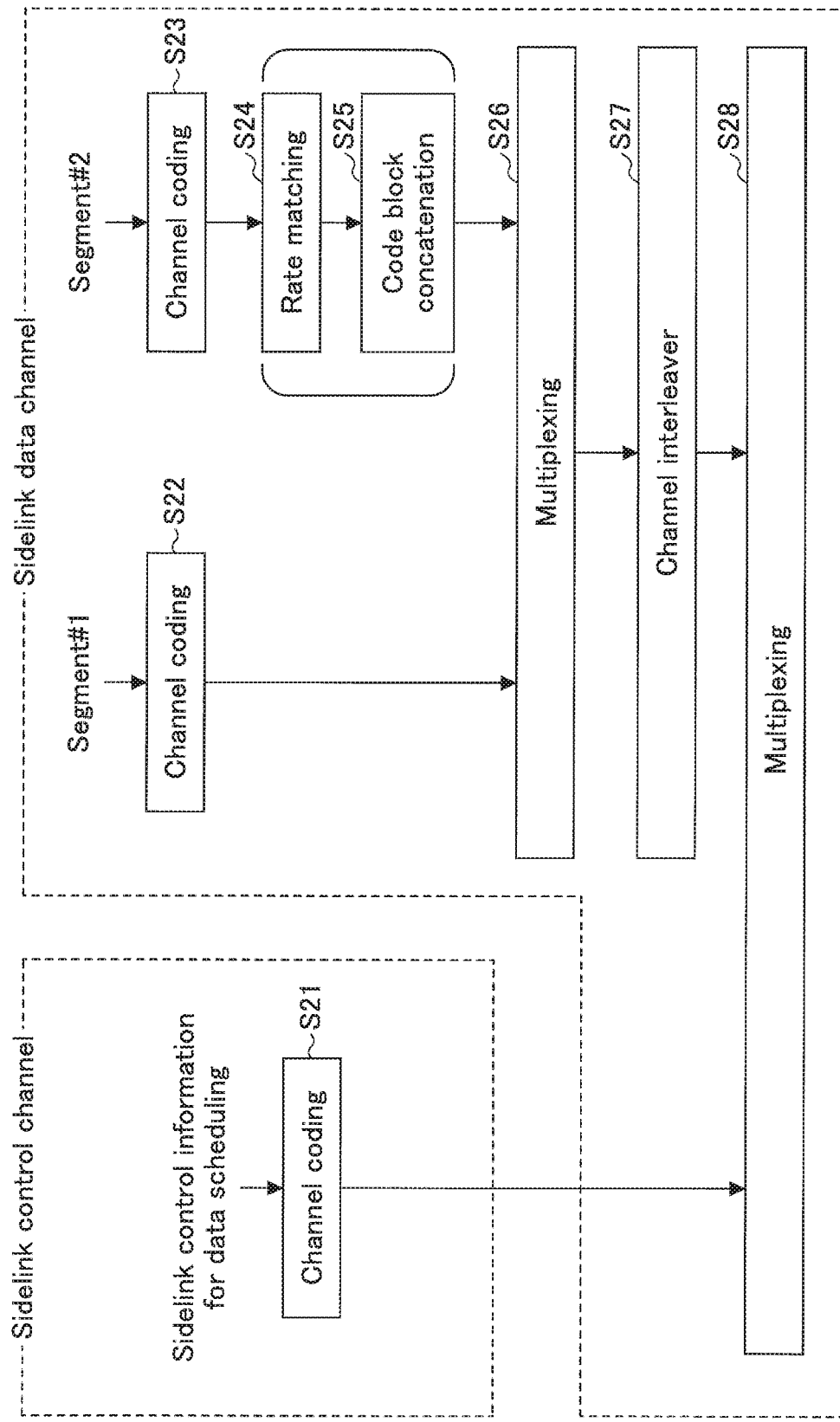
FIG. 19 is a diagram illustrating an example (type 2) of a procedure of transmitting a discovery message.

FIG. 18 illustrates an example of Type 2. As illustrated in FIG. 18, the process for the sidelink control channel and the process for the sidelink data channel are performed.

In the process for the sidelink control channel, the information of the SCI for data scheduling (the bit string to which the CRC is added) and the information of segment #1 (the bit string to which the CRC is added) are channel-coded (steps S11, S12), and multiplexed (step S13).

In the process for the sidelink data channel, channel coding, rate matching, code block concatenation, and channel interleaving are executed on the information of segment #2 (bit string to which CRC is added) (steps S14 to S17).

The SCI and segment #1 that have been multiplexed in step S13, and segment #2 that has undergone the processes of steps S14 to S17, are multiplexed (step S18). Subsequently, the SCI and the discovery message are transmitted as radio signals from the antenna by performing scrambling, modulation, mapping to resources, etc.

In the example illustrated in FIG. 18, on the receiving side, segment #1 can be detected regardless of whether SCI for data scheduling is detected.

FIG. 19 illustrates another example of type 2. As illustrated in FIG. 19, the process for the sidelink control channel and the process for the sidelink data channel are performed. However, unlike the example of FIG. 18, in the example of FIG. 19, both segment #1 and segment #2 are transmitted on the data channel.

In the process for the sidelink control channel, SCI information for data scheduling (bit string to which CRC is added) is channel-coded (step S21).

In the process for the sidelink data channel, the information of segment #1 (the bit string to which the CRC is added) is channel-coded (step S22). Furthermore, channel coding, rate matching, and code block concatenation are executed on the information of segment #2 (bit string to which CRC is added) (steps S23 to S25). Segment #1 that has undergone the process of S22 and segment #2 that has undergone the processes of steps S23 to S25 are multiplexed and channel interleaved (steps S26, S27). Then, the SCI and multiplexed segment #1 and segment #2, are multiplexed (step S28). Subsequently, the SCI and the discovery message are transmitted as radio signals from the antenna by performing scrambling, modulation, mapping to resources, etc.

In the example illustrated in FIG. 19, on the receiving side, segment #1 is detected when the SCI is correctly detected. Furthermore, in the example illustrated in FIG. 19, better time/frequency diversity is obtained for segment #1 than in other examples.

<Transmission Example of Discovery Message>

Next, a transmission example of a discovery message will be described with reference to FIGS. 20 to 24. In FIGS. 20 to 24, the horizontal axis represents time and the vertical axis represents frequency, as illustrated. Furthermore, the illustrated "No modification period" indicates a period during which there are no changes in the report content of segment #1. For example, the user apparatus UE2 on the receiving side can identify that HARQ soft combining of segment #1 is possible within "No modification period". Furthermore, the user apparatus UE2 on the receiving side may regard the parameters in segment #1 that have once been successfully detected in "No modification period", as valid within the "No modification period". Note that the number of times of transmitting the discovery message in "No modification period" in FIGS. 20 to 24, is merely one example. The number of transmissions may be larger than the number of transmissions illustrated in FIGS. 20 to 24.

Figure 20:
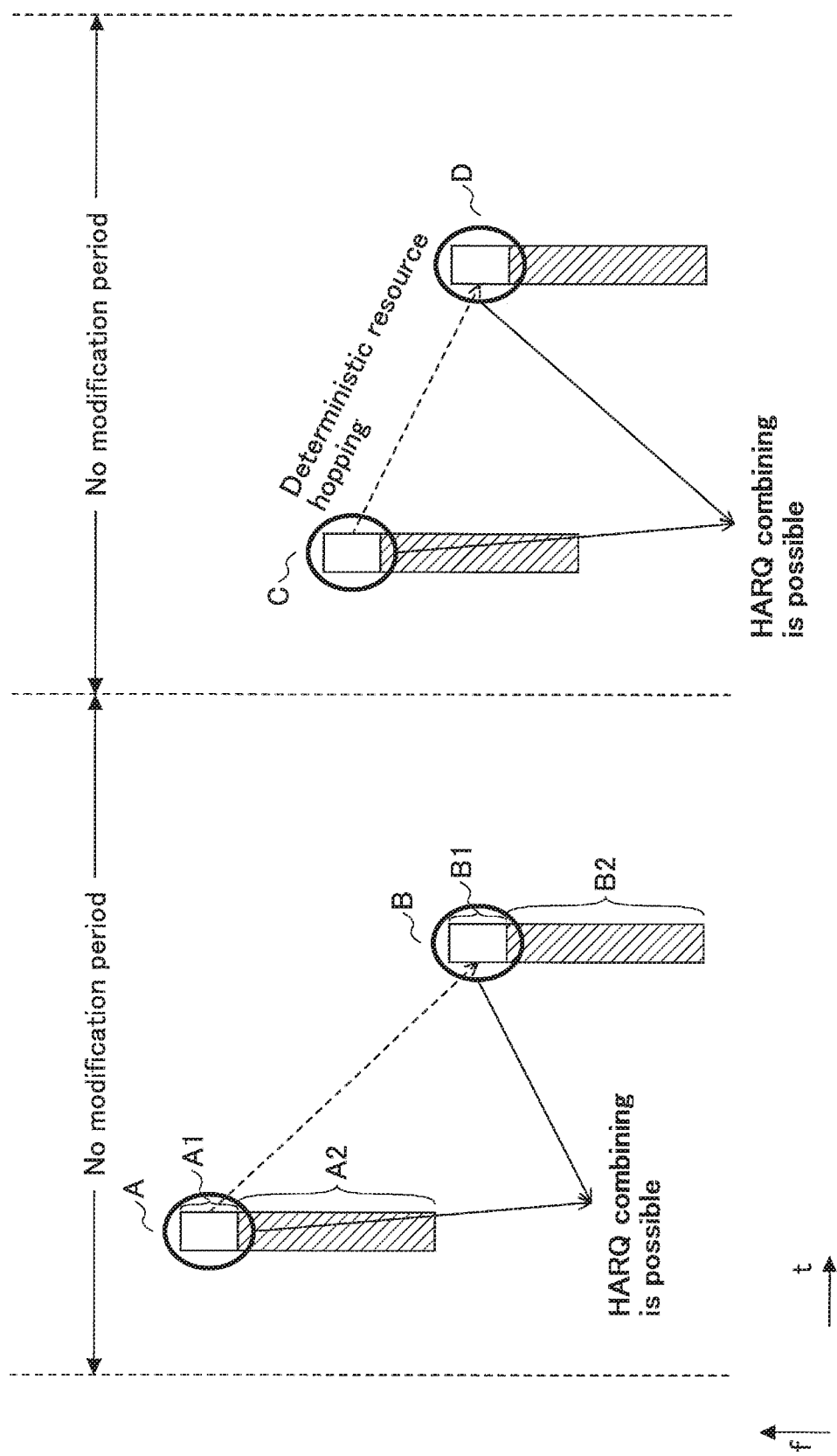
FIG. 20 is a diagram illustrating a transmission example (type 1) of a discovery message.

FIG. 20 illustrates a transmission example of type 1. As illustrated in FIG. 20, in the first "No modification period", a discovery message indicated by A and a discovery message indicated by B are transmitted. As described in C and D, the resources in multiple transmissions are determined, for example, based on a predetermined hopping pattern.

The illustrated A1 and B1 are segment #1, and A2 and B2 are segment #2, respectively. Within "No modification period", A1 and B1 are the same payload (information in which the same contents are encoded). Furthermore, A1 and B1 have a fixed size and a fixed MCS. However, RV can change between A1 and B1. A2 and B2 are payloads that may be changed each time the transmission is performed. The size and the MCS may be fixed or may be changed each time the transmission is performed.

The user apparatus UE2 on the receiving side can receive segment #1 by performing soft combining of HARQ (for example, incremental redundancy (IR) combining) by using A1 and B1.

Also in the next "No modification period", as indicated by C and D, the discovery message is transmitted similar to the case of the first "No modification period".

Figure 21:
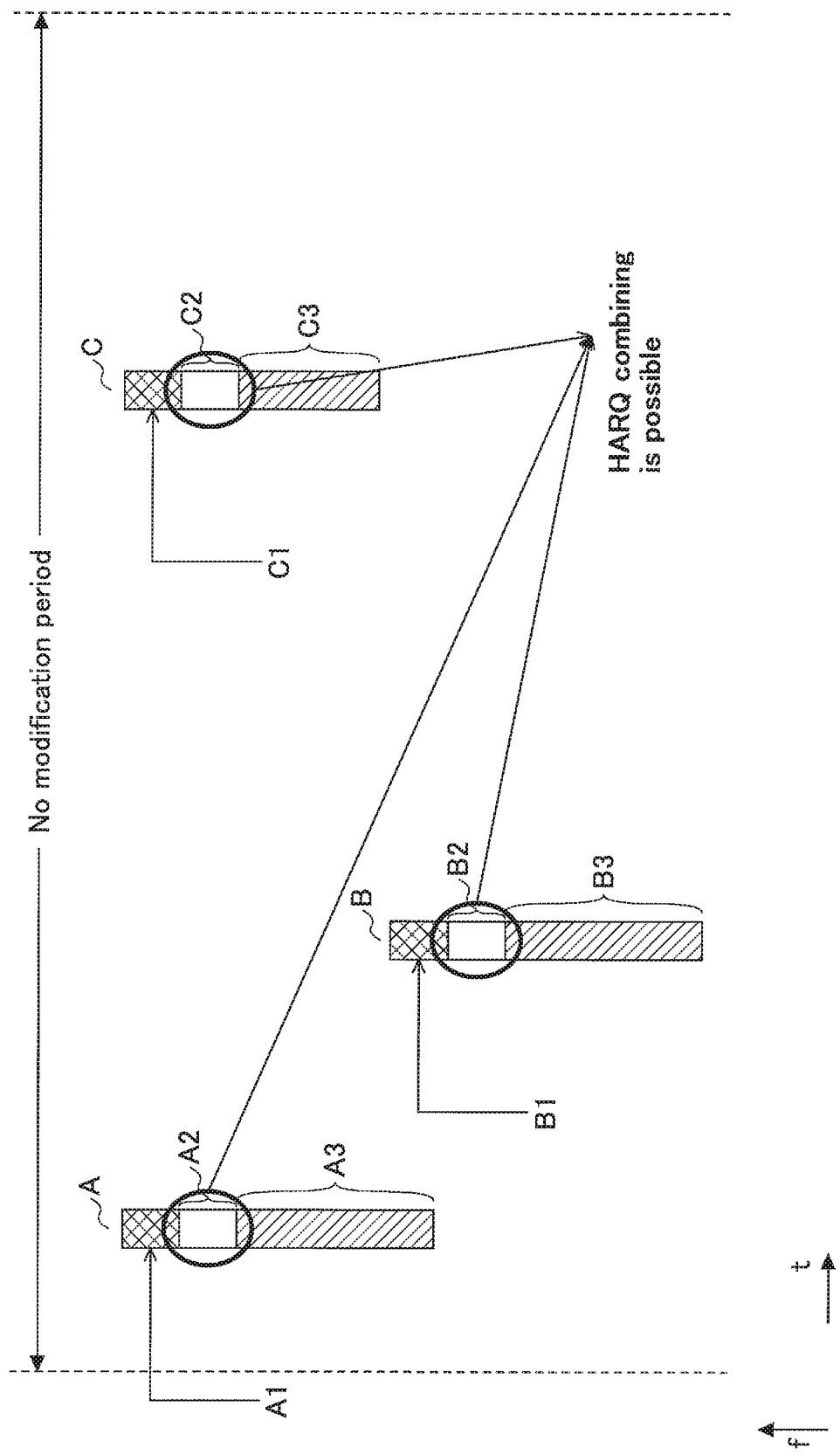
FIG. 21 is a diagram illustrating a transmission example (type 2) of a discovery message.

FIG. 21 illustrates a transmission example of type 2. As illustrated in FIG. 21, in "No modification period", SCI+discovery message indicated by A, SCI+discovery message indicated by B, and SCI+discovery message indicated by C are transmitted. Resources for multiple transmissions are determined, for example, based on a predetermined hopping pattern.

The illustrated A1, B1, and C1 are SCIs for data scheduling (scheduling of segment #1 and/or segment #2), respectively.

The illustrated A2, B2, and C2 are segment #1, and A3, B3, and C3 are segment #2, respectively. Within "No modification period", A2, B2 and C3 are the same payload (information in which the same contents are encoded). A3, B3, and C3 are payloads that may be changed each time the transmission is performed. The size and MCS in A3, B3, C3 may be changed each time the transmission is performed.

The user apparatus UE2 on the receiving side can perform soft combining of HARQ by using A2, B2, and C2 to receive segment #1.

Figure 22:
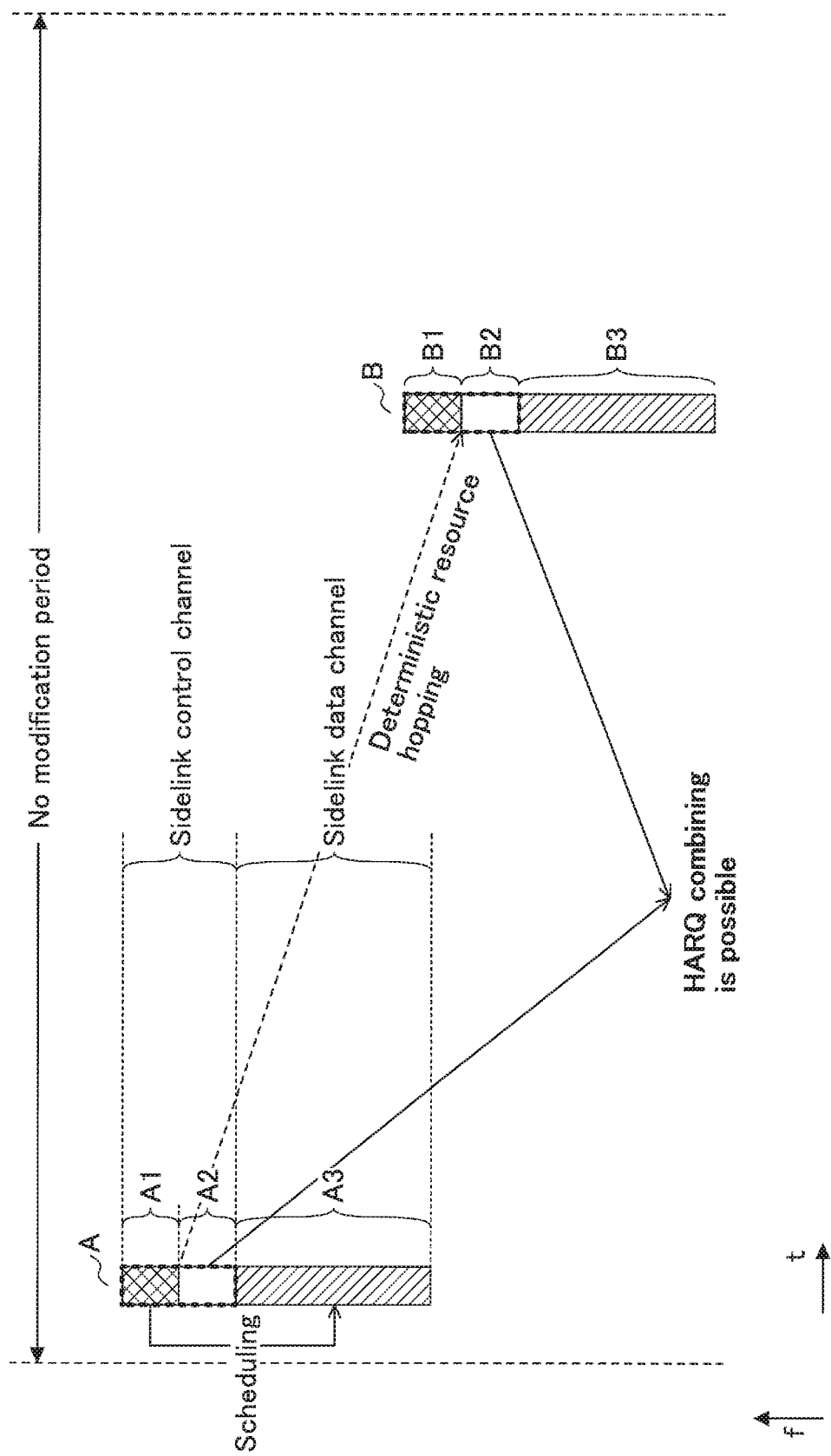
FIG. 22 is a diagram illustrating a transmission example (type 2) of a discovery message.

FIG. 22 also illustrates a transmission example of type 2. As illustrated in FIG. 22, SCI+discovery message indicated by A and SCI+discovery message indicated by B are transmitted in "No modification period". Resources for multiple transmissions are determined, for example, based on a predetermined hopping pattern.

The illustrated A1 and B1 are SCIs for data scheduling (scheduling of segment #2), respectively. The payload of this SCI can be changed each time the transmission is performed.

The illustrated A2 and B2 are segment #1, and A3 and B3 are segment #2, respectively. Within "No modification period", A2 and B2 are the same payload (information in which the same contents are encoded). A3, B3 are payloads that can be changed each time the transmission is performed. The size and MCS in A3, B3 can be changed each time the transmission is performed.

In the example of FIG. 22, SCI and segment #1 are transmitted on the sidelink control channel and segment #2 is transmitted on the sidelink data channel, as illustrated.

Figure 23:
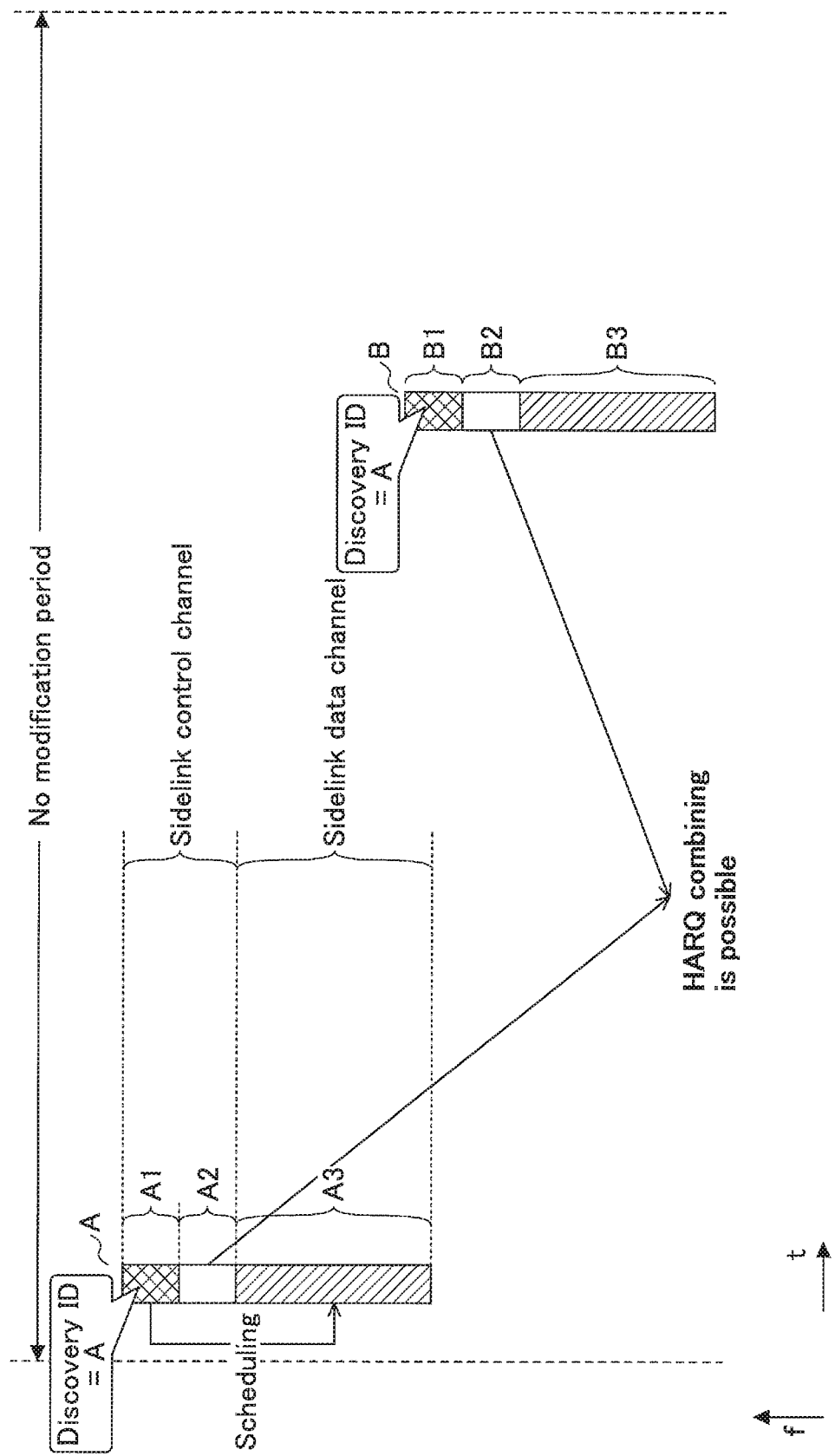
FIG. 23 is a diagram illustrating a transmission example (type 2) of a discovery message.

FIG. 23 also illustrates a transmission example of type 2. In the example of FIG. 23, the SCI includes ID=A that is the ID of the transmission source that executes the discovery. Otherwise, this example is the same as the example of FIG. 22.

Figure 24:
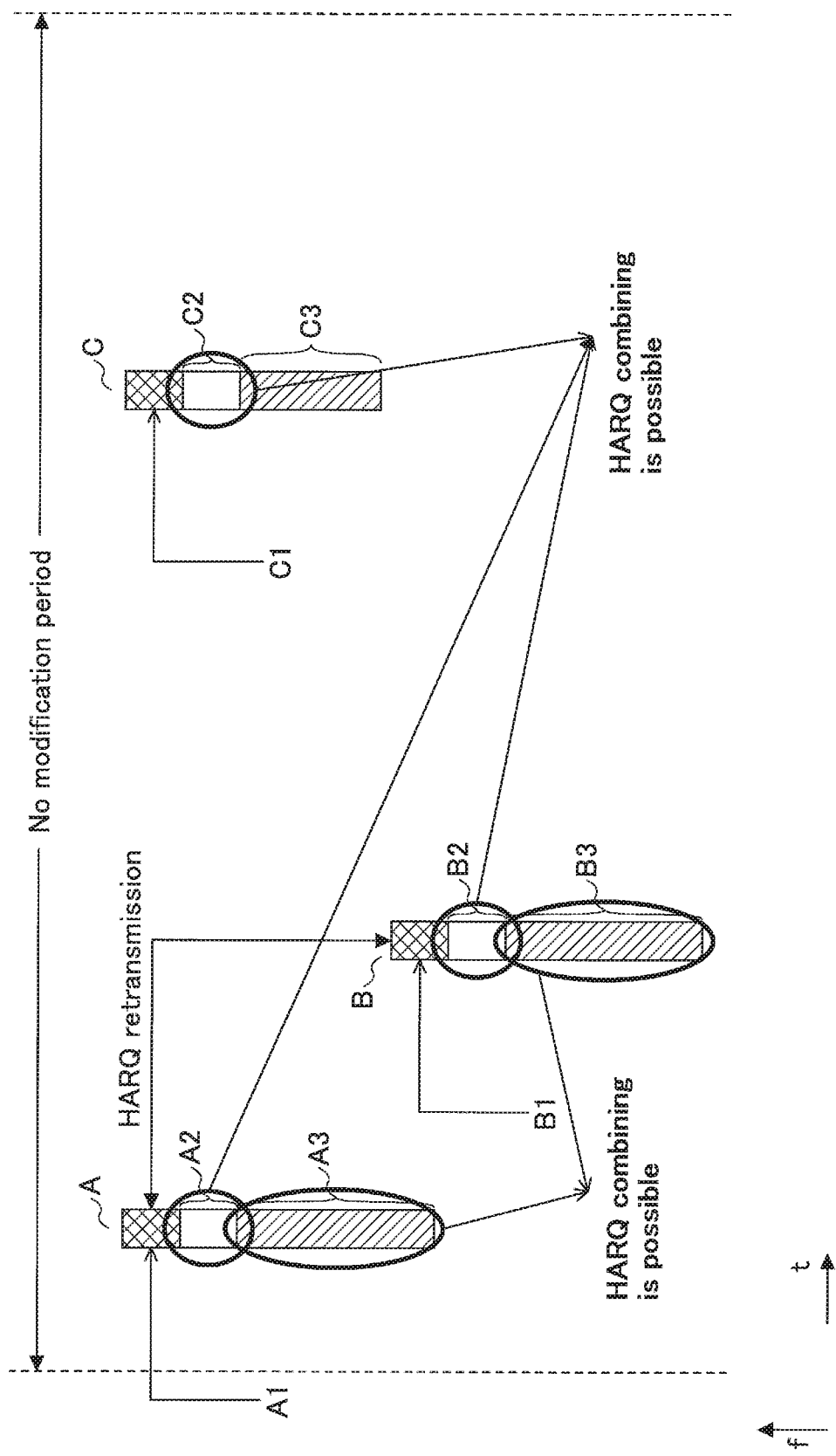
FIG. 24 is a diagram illustrating a transmission example (type 2) of a discovery message.

Upon detecting ID=A in the received SCI, the user apparatus UE2 on the receiving side can identify that the data scheduled by this SCI is segment #2 of the discovery message transmitted from the UE with ID=A. FIG. 24 also illustrates a transmission example of type 2. As illustrated in FIG. 24, in "No modification period", SCI+discovery message indicated by A, SCI+discovery message indicated by B, and SCI+discovery message indicated by C are transmitted. Resources for multiple transmissions are determined, for example, based on a predetermined hopping pattern.

The illustrated A1, B1, C1 are SCIs for data scheduling (scheduling of segment #1 and/or segment #2), respectively.

The illustrated A2, B2, and C2 are segment #1, and A3, B3, and C3 are segment #2, respectively. Within "No modification period", A2, B2, and C3 are the same payload (information in which the same contents are encoded). A3, B3, and C3 are payloads that can be changed each time the transmission is performed. The size and MCS in A3, B3, and C3 can be changed each time the transmission is performed.

In the example of FIG. 24, soft combining is possible for segment #1 with A2, B2, and C2. Furthermore, in the example of FIG. 24, for example, by the second transmission of SCI, it is indicated that segment #2 is transmitted again, and therefore it is possible to perform soft combining of segment #2 (A3) of the first transmission and segment #2 (B3) of the second transmission.

<Regarding Multiplexing Method, Encoding, Etc.>

In FIGS. 20 to 24, examples in which segment #1 and segment #2 are frequency-multiplexed (FDM) are illustrated; however, these are only examples. Segment #1 and segment #2 may be time division multiplexed (TDM) or code division multiplexed (CDM).

Furthermore, in FIG. 20 to FIG. 24, examples in which the SCI and segment #1 are frequency multiplexed (FDM) are illustrated; however, this is only an example. The SCI and segment #1 may be time division multiplexed (TDM) or code division multiplexed (CDM). Furthermore, segment #1 may be used for the scheduling of segment #2.

Regarding encoding, for example, MCS, the encoding rate (or MCS offset, encoding rate offset), etc., are set (or preset) in the user apparatus UE from base station 10, with respect to each of segment #1 and segment #2. Furthermore, a value defined by a specification, etc., may be set in the user apparatus UE.

As an example, when different reliabilities are required for segment #1 and segment #2 (for example, segment #2 has a higher reliability), it is considered that the encoding rate of either segment #1 or segment #2 is set to be lower than the other (for example, the encoding rate of segment #2 is lowered when segment #2 has higher reliability).

<Regarding Modification Period>

Regarding the modification period (corresponding to the No modification period in FIGS. 20 to 24), it is necessary for the user apparatuses UEs to share a common recognition regarding the start timing (time offset) and the time length. Therefore, the modification period is determined based on a predetermined reference time, etc. The reference time is, for example, UTC-time, a frame number, a subframe number, and a slot number, etc. Furthermore, the period (time length) and the time offset of the modification period may be (pre) configured in the user apparatus UE.

<Regarding Validation of Segment #1>

There are the following options 1 to 4 for confirming the validity of segment #1 in the user apparatus UE2 on the receiving side.

Option 1) The user apparatus UE2 determines that the most recently (latest) detected segment #1 is valid. That is, every time segment #1 is detected, it is determined that segment #1 is valid.

Option 2) The user apparatus UE2 determines that segment #1 detected in the nth modification period is valid in the (n+m)th modification period. For example, m=1. Furthermore, m may be configured from the base station 10 or may be preconfigured. Also, m may be indicated by a discovery message (segment #1 and/or segment #2).

Option 3) When the user apparatus UE2 detects that a change has been made in the DMRS sequence in the received discovery message or in a predetermined portion in the received discovery message, the user apparatus UE2 determines that segment #1 has been changed.

Option 4) When the user apparatus UE2 detects that the modification indicator in the SCI for discovery message scheduling indicates "no update", the user apparatus UE2 determines that segment #1 detected immediately before is valid. For example, in the example of FIG. 21, if the modification indicator in SCI in B indicates "no update", the user apparatus UE2 determines that segment #1 in A is valid.

<Regarding Validation of Segment #2>

The user apparatus UE2 on the receiving side, for example, determines that segment #2 detected most recently (latest) is valid. That is, every time segment #2 is detected, it is determined that the detected segment #2 is valid.

The embodiment 2 uses a discovery message, in which segment #1 that can be soft combined and that includes information that is not frequently changed, and segment #2 including information that may change every time message transmission is performed, are multiplexed, and therefore even when the information to be transmitted may be changed frequently, the user apparatus UE on the transmitting side can appropriately transmit messages. Furthermore, the user apparatus UE on the receiving side accurately identifies parameters (for example, parameters for reception of segment #2 and parameters for D2D communication transmission) in segment #1, and therefore the user apparatus UE on the receiving side can appropriately receive segment #2 and appropriately determine the destination UE in the D2D communication and execute transmission in D2D communication to the destination UE, etc. Note that also in the embodiment 2, the user apparatus UE2 on the receiving side can perform the measurement in the same manner as the measurement using the discovery message in the embodiment 1.

(Association Between Discovery and D2D Communication)

Next, the association between discovery and D2D communication will be described. The contents here can be applied to both of the embodiment 1 and the embodiment 2.

When the user apparatus UE2 on the receiving side detects the location of the transmission source UE, the user apparatus UE2 on the receiving side can selectively receive the data of the D2D communication transmitted from a plurality of transmission source UEs. As methods for performing this, there are the following options 1 and option 2 (option 2-1, 2-2).

Option 1) Information on time/frequency resources of D2D communication is included in the discovery message transmitted from the user apparatus UE on the transmitting side. The time/frequency resources are, for example, resources used by the user apparatus UE1 for transmission (transmission of control information and/or data) in D2D communication. Note that the time/frequency resources used for transmitting the discovery message and the time/frequency resources used for transmission in the D2D communication may be different.

Figure 25:
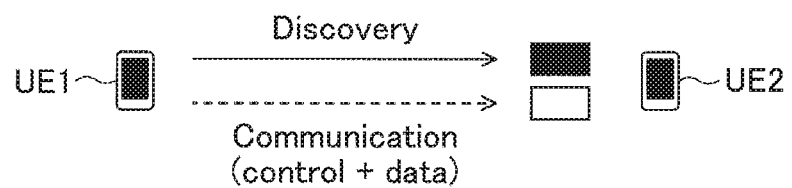
FIG. 25 is a diagram for describing an association between discovery and communication.

For example, as illustrated in FIG. 25, the user apparatus UE2 on the receiving side can receive the control information/data of the D2D communication by using the time/frequency resources for D2D communication included in the received discovery message.

Option 2) In option 2, the ID (discovery ID) of the user apparatus UE on the transmitting side included in the discovery message transmitted from the user apparatus UE on the transmitting side, is used for reception of control information/data in D2D communication at the UE on the receiving side. Specifically, there are the following options 2-1 and 2-2.

In option 2-1, the CRC of the SCI used for the data scheduling in D2D communication is masked by a UE-ID (or a processed UE-ID). The user apparatus UE2 on the receiving side can receive the SCI and the data by unmasking the CRC with the UE-ID acquired by the discovery message.

In option 2-2, SCI used for data scheduling in D2D communication or data is scrambled by the UE-ID (or a processed UE-ID). The user apparatus UE2 on the receiving side can receive the SCI and the data by descrambling the SCI/data with the UE-ID acquired by the discovery message. Note that the above "processed" means, for example, setting the bit length of the UE-ID to a predetermined bit length.

(Regarding Cross Carrier Discovery)

The content here can also be applied to both the embodiment 1 and the embodiment 2. In the discovery message, the AS parameters for D2D communication and frequencies used for transmission and/or reception in D2D communication may be included.

Furthermore, the transmission of the discovery message and the transmission in D2D communication associated with the discovery may be performed at different frequencies with different RATs. For example, D2D communication may be performed with NR sidelink and the discovery may be performed with LTE V2X or IEEE 802.11p.

For example, when the discovery message is transmitted at a frequency that is lower than the frequency used in the D2D communication, a sufficient discovery range can be obtained without HARQ combining.

(Device Configuration)

Next, a functional configuration example of the user apparatus UE and the base station 10 that execute the processing operations described so far will be described. The user apparatus UE and the base station 10 may include all the functions of the embodiment 1 and the embodiment 2, or may include the functions of only one of the embodiments.

<User Apparatus>

Figure 26:
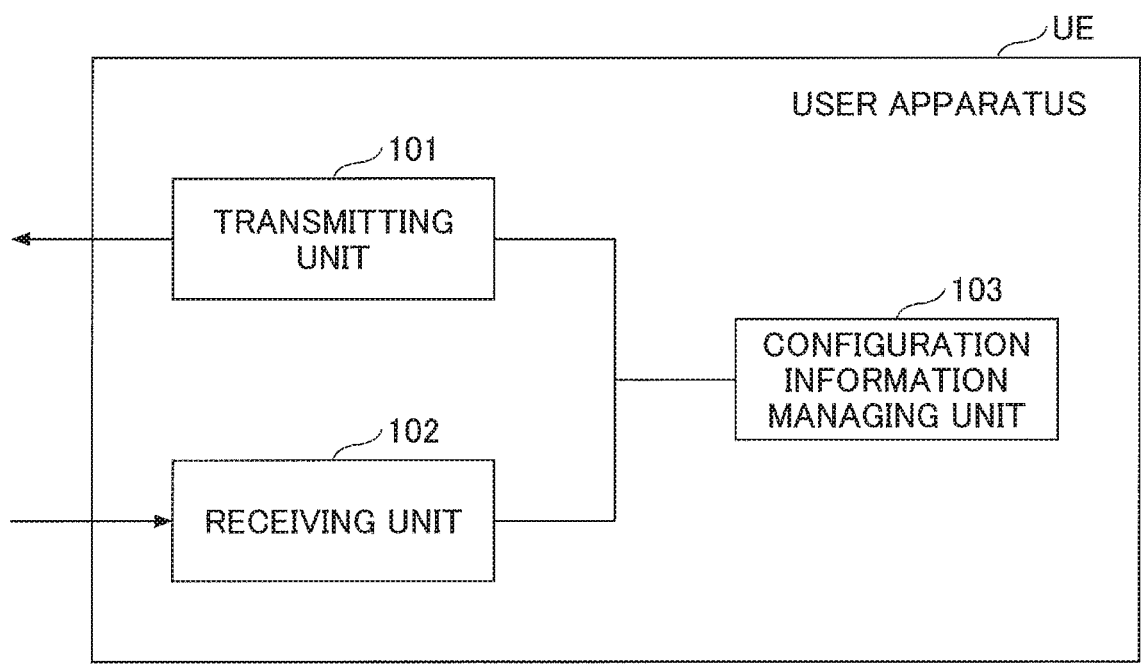
FIG. 26 is a diagram illustrating an example of a functional configuration of a user apparatus UE according to an embodiment.

FIG. 26 is a diagram illustrating an example of the functional configuration of the user apparatus UE. As illustrated in FIG. 26, the user apparatus UE includes a transmitting unit 101, a receiving unit 102, and a configuration information managing unit 103. The functional configuration illustrated in FIG. 26 is merely an example. As long as the operations according to the present embodiment can be executed, the functional sections and the names of the functional units are not limited to this example.

The transmitting unit 101 creates a transmission signal from the transmission data and wirelessly transmits the transmission signal. The receiving unit 102 wirelessly receives various signals, and acquires a signal of a higher layer from the signal of the received physical layer. Both the transmitting unit 101 and the receiving unit 102 include a D2D function and a cellular communication function. The transmitting unit 101 includes a function of executing the operations of message/SCI/data/signal transmission described in the embodiments 1 and 2, and the receiving unit 102 includes a function of executing the operations of message/SCI/data/signal reception described in the embodiments 1 and 2.

The configuration information managing unit 103 stores various kinds of configuration information received from the base station 10 by the receiving unit 102 and preset configuration information.

Figure 27:
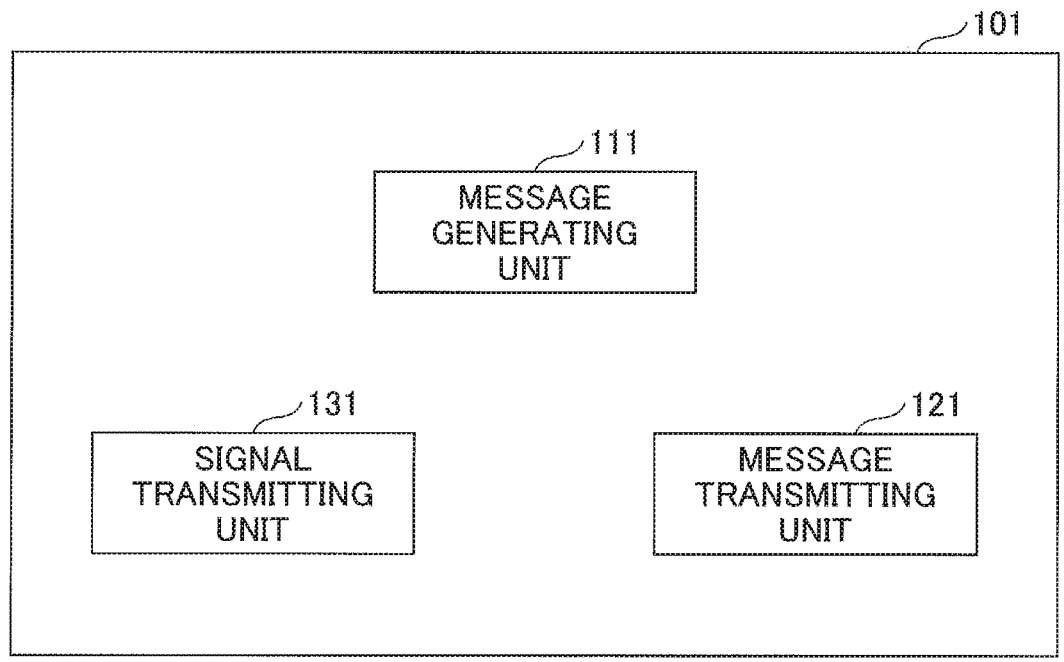
FIG. 27 is a diagram illustrating a configuration example of a transmitting unit 101.

Furthermore, as illustrated in FIG. 27, the transmitting unit 101 includes a message generating unit 111, a message transmitting unit 121, and a signal transmitting unit 131. For example, as illustrated in FIGS. 17 to 19, the message generating unit 111 generates a discovery message. The message transmitting unit 121 transmits the discovery message in the embodiments 1 and 2, and the signal transmitting unit 131 transmits the discovery signal in the embodiment 1.

Furthermore, the signal transmitting unit 131 is configured to transmit a signal used for measurement of the radio quality in another user apparatus, and the message transmitting unit 121 is configured to transmit a message including a predetermined parameter, and the transmission period of signals transmitted by the signal transmitting unit 131 may be independent of the transmission period of messages transmitted by the message transmitting unit 121. Furthermore, the receiving unit 102 may be configured to receive, from the base station 10, parameters used for receiving signals transmitted from other user apparatuses.

Furthermore, the message generating unit 111 is configured to generate a message including a first segment and a second segment, and the message transmitting unit 121 is configured to transmit the message a plurality of times within a predetermined period, and the information reported by a plurality of first segments transmitted within the predetermined period by the message transmitting unit 121, may not be changed within the predetermined period.

The message transmitting unit 121 may be configured to transmit control information including scheduling information of the second segment, or control information including scheduling information of the first segment and the second segment, and the message.

The message transmitting unit 121 may be configured to transmit the first segment by using a control channel and transmit the second segment by using a data channel.

The message transmitting unit 121 may be configured to transmit the message a plurality of times within the predetermined period, by using a predetermined resource hopping pattern or a resource hopping pattern set from the base station in the radio communication system.

<Base Station 10>

Figure 28:
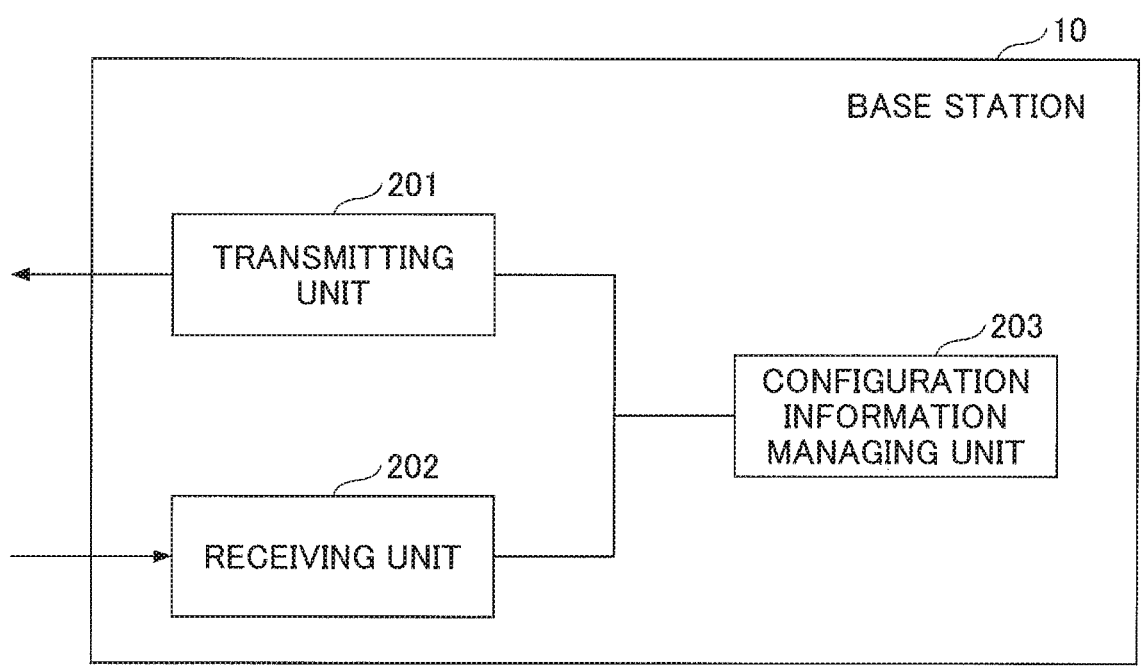
FIG. 28 is a diagram illustrating an example of a functional configuration of a base station 10 according to an embodiment.

FIG. 28 is a diagram illustrating an example of the functional configuration of the base station 10. As illustrated in FIG. 28, the base station 10 includes a transmitting unit 201, a receiving unit 202, and a configuration information managing unit 203. The functional configuration illustrated in FIG. 28 is merely an example. As long as the operations according to the present embodiment can be executed, the functional sections and the names of the functional units are not limited to this example.

The transmitting unit 201 includes a function of generating a signal to be transmitted to the user apparatus UE side and wirelessly transmitting the signal. The receiving unit 202 includes a function of receiving various signals transmitted from the user apparatus UE and acquiring, for example, information of a higher layer, from the received signals.

The transmitting unit 201 includes a function of executing operations for transmitting signals such as configuration information, etc., to the user apparatus UE described in the embodiments 1 and 2, and the receiving unit 202 includes a function of executing operations for receiving signals from the user apparatus UE. The operations of signal transmission include scheduling.

The configuration information managing unit 203 stores various kinds of configuration information to be transmitted to the user apparatus UE, various kinds of configuration information received from the user apparatus UE, and configuration information preset.

<Hardware Configuration>

The block diagrams (FIGS. 26 to 28) used in the description of the above embodiment illustrate blocks of functional units. These functional blocks (constituent parts) are implemented by any combination of hardware and/or software. Furthermore, the means for implementing each functional block is not particularly limited. That is, the respective functional blocks may be implemented by a single device in which a plurality of elements are physically and/or logically combined; or two or more devices, which are physically and/or logically separated, may be directly and/or indirectly (for example, wired and/or wireless) connected, and the respective functional blocks may be implemented by these plural devices.

Figure 29:
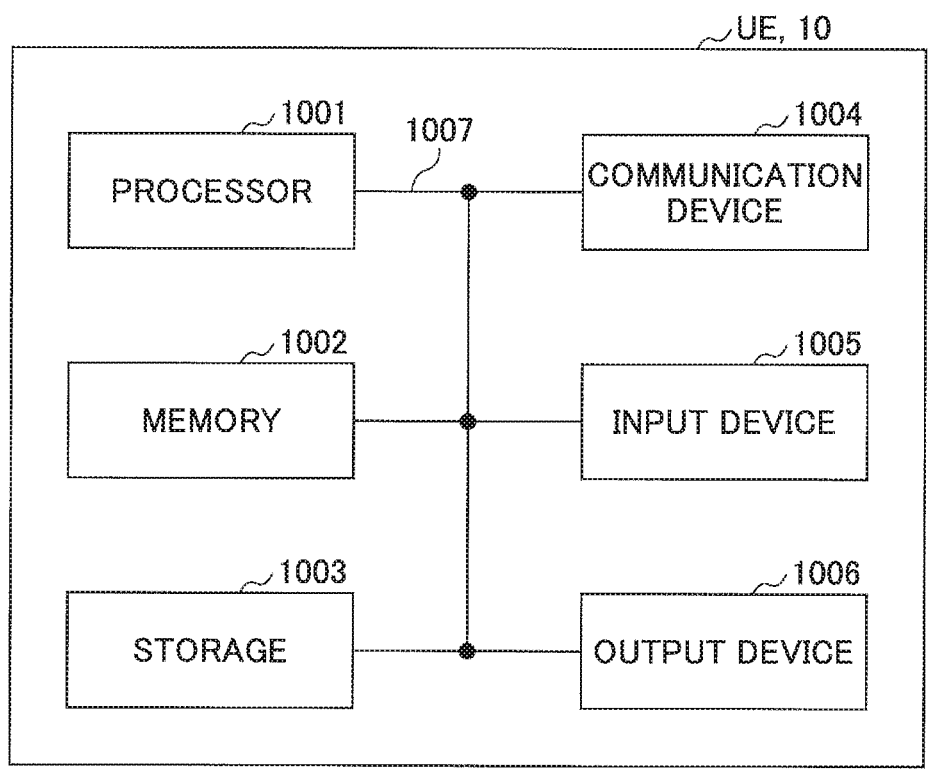
FIG. 29 is a diagram illustrating an example of a hardware configuration of the base station 10 and the user apparatus UE according to an embodiment.

Furthermore, for example, both the user apparatus UE and the base station 10 according to one embodiment of the present invention may function as a computer that performs processes according to the present embodiment. FIG. 29 is a diagram illustrating an example of a hardware configuration of the user apparatus UE and the base station 10 according to the present embodiment. Each of the user apparatus UE and the base station 10 described above may be physically configured as a computer device including a processor 1001, a memory 1002, a storage 1003, a communication device 1004, an input device 1005, an output device 1006, and a bus 1007, etc.

Note that in the following description, the term "device" can be read as a circuit, a device, and a unit, etc. The hardware configuration of the user apparatus UE and the base station 10 may be configured to include one or a plurality of devices indicated by the reference numerals 1001 to 1006 illustrated in the drawing, or may be configured to not include some of the devices.

The respective functions of the user apparatus UE and the base station 10 are implemented by having predetermined software (programs) to be loaded in the hardware such as the processor 1001 and the memory 1002 so that the processor 1001 performs computation and controls the communication performed by the communication device 1004 and the reading and/or writing of data in the memory 1002 and the storage 1003.

The processor 1001, for example, operates the operating system to control the entire computer. The processor 1001 may be configured with a Central Processing Unit (CPU) including an interface with peripheral devices, a control device, an arithmetic device, and a register, etc.

Furthermore, the processor 1001 loads programs (program codes), software modules, or data from the storage 1003 and/or the communication device 1004 into the memory 1002, and executes various processes according to these elements. As the program, a program for causing a computer to execute at least part of the operation described in the above embodiment, is used. For example, the transmitting unit 101, the receiving unit 102, and the configuration information managing unit 103 of the user apparatus UE illustrated in FIG. 26 may be implemented by a control program that is stored in the memory 1002 and that operates on the processor 1001. Furthermore, for example, the transmitting unit 201, the receiving unit 202, and the configuration information managing unit 203 of the base station 10 illustrated in FIG. 28 may be implemented by a control program that is stored in the memory 1002 and that operates on the processor 1001. Although it has been described that the various processes described above are executed by a single processor 1001, the various processes described above may be executed simultaneously or sequentially by two or more processors 1001. The processor 1001 may be implemented by one or more chips. Note that the programs may be transmitted from the network via an electric communication line.

The memory 1002 is a computer-readable recording medium, and is configured with at least one of a ROM (Read-Only Memory), an EPROM (Erasable Programmable ROM), an EEPROM (Electrically Erasable Programmable ROM), and a RAM (Random Access Memory), for example. The memory 1002 may be referred to as a register, a cache, and a main memory (main memory), etc. The memory 1002 can store executable programs (program codes) and software modules, etc., for implementing the processes according to an embodiment of the present invention.

The storage 1003 is a computer-readable recording medium, and may be configured with at least one of, for example, an optical disk such as a CD-ROM (Compact Disc ROM), a hard disk drive, a flexible disk, a magneto-optical disk (for example, a compact disk, a digital versatile disk, a Blu-ray (Registered trademark) disk), a smart card, a flash memory (for example, a card, a stick, a key drive), a floppy (registered trademark) disk, and a magnetic strip, etc. The storage 1003 may be referred to as an auxiliary storage device. The above-described storage medium may be, for example, a database including the memory 1002 and/or the storage 1003, a server, or other appropriate media.

The communication device 1004 is hardware (transmission/reception device) for performing communication between computers via a wired and/or wireless network, and is also referred to as a network device, a network controller, a network card, and a communication module, etc., for example. For example, the transmitting unit 101 and the receiving unit 102 of the user apparatus UE may be implemented by the communication device 1004. Furthermore, the transmitting unit 201 and the receiving unit 202 of the base station 10 may be implemented by the communication device 1004.

The input device 1005 is an input device (for example, a keyboard, a mouse, a microphone, a switch, a button, and a sensor, etc.) that accepts input of information from the outside. The output device 1006 is an output device (for example, a display, a speaker, and an LED lamp, etc.) that outputs information to the outside. Note that the input device 1005 and the output device 1006 may be integrated (for example, a touch panel).

Furthermore, the respective devices such as the processor 1001 and the memory 1002 are connected by the bus 1007 for communicating information. The bus 1007 may be configured with a single bus or may be configured with different buses between the respective devices.

Furthermore, each of the user apparatus UE and the base station 10 may include hardware such as a microprocessor, a digital signal processor (DSP), an application specific integrated circuit (ASIC), a programmable logic device (PLD), and a field programmable gate array (FPGA), and some of or all of the functional blocks may be implemented by this hardware. For example, the processor 1001 may be implemented with at least one of these hardware elements.

Summary of Embodiment

As described above, according to the present embodiment, a user apparatus in a radio communication system supporting a D2D technology is provided, the user apparatus including a signal transmitting unit configured to transmit a signal used for measuring a radio quality in another user apparatus; and a message transmitting unit configured to transmit a message including a predetermined parameter, wherein a transmission period of the signals transmitted by the signal transmitting unit is independent of a transmission period of the messages transmitted by the message transmitting unit.

According to the above configuration, a technology for enabling a user apparatus to appropriately measure the radio quality, while avoiding an increase in the overhead of radio resources in D2D, is provided.

The predetermined parameter may include a parameter used for receiving the signal. According to this configuration, the user apparatus on the receiving side can appropriately receive the signals.

A transmission parameter of the signal may be derived from a transmission parameter of the message, or the transmission parameter of the message may be derived from the transmission parameter of the signal. According to this configuration, the signaling overhead can be reduced.

The signal may be a physical signal that does not include a message. According to this configuration, the signal can be transmitted with a small number of radio resources.

The user apparatus may further include a receiving unit configured to receive, from a base station in the radio communication system, a parameter used for receiving a signal transmitted from the other user apparatus. According to this configuration, signals transmitted from the other user apparatus can be appropriately received.

Furthermore, according to the present embodiment, a transmission method executed by a user apparatus in a radio communication system supporting a D2D technology is provided, the transmission method including a signal transmitting step of transmitting a signal used for measuring a radio quality in another user apparatus; and a message transmitting step of transmitting a message including a predetermined parameter, wherein a transmission period of the signals transmitted at the signal transmitting step is independent of a transmission period of the messages transmitted at the message transmitting step.

According to the above configuration, a technology for enabling a user apparatus to appropriately measure the radio quality, while avoiding an increase in the overhead of radio resources in D2D, is provided.

Furthermore, as described above, according to the present embodiment, a user apparatus in a radio communication system supporting a D2D technology is provided, the user apparatus including a message generating unit configured to generate a message including a first segment and a second segment; and a message transmitting unit configured to transmit, multiple times, the message within a predetermined period, wherein information reported by a plurality of the first segments transmitted within the predetermined period by the message transmitting unit, is not changed within the predetermined period.

According to the above configuration, a technology for enabling messages to be appropriately transmitted and received, even when the information, which is transmitted in the message by the user apparatus on the transmitting side, may be frequently changed, in D2D, is provided.

The message transmitting unit may transmit control information including scheduling information of the second segment or control information including scheduling information of the first segment and the second segment, and the message. According to this configuration, the user apparatus on the receiving side can quickly receive the message.

The message transmitting unit may transmit the first segment by using a control channel, and transmit the second segment using a data channel. According to this configuration, for example, it is possible to use an existing channel and implementation is relatively easy.

The message transmitting unit may transmit, multiple times, the message within the predetermined period, by using a predetermined resource hopping pattern or a resource hopping pattern set from a base station in the radio communication system. According to this configuration, the user apparatus on the receiving side can appropriately receive the message.

HARQ soft combining may be executed at another user apparatus, with respect to a plurality of the first segments transmitted within the predetermined period by the message transmitting unit. According to this configuration, the other user apparatus can properly receive the first segment.

Furthermore, according to the present embodiment, a transmission method executed by a user apparatus in a radio communication system supporting a D2D technology is provided, the transmission method including a message generating step of generating a message including a first segment and a second segment; and a message transmitting step of transmitting, multiple times, the message within a predetermined period, wherein information reported by a plurality of the first segments transmitted within the predetermined period at the message transmitting step, is not changed within the predetermined period.

According to the above configuration, a technology for enabling messages to be appropriately transmitted and received, even when the information, which is transmitted in the message by the user apparatus on the transmitting side, may be frequently changed, in D2D, is provided.

Supplement to Embodiment

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless there is no contradiction). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the processing procedures described in the embodiment, the order of processes may be changed as long as there is no inconsistency. For the sake of convenience of description, the user apparatus UE and the base station 10 have been described using the functional block diagrams, but such apparatuses may be implemented by hardware, software, or a combination thereof. Software executed by the processor included in the user apparatus UE according to the embodiment of the present invention, and the software executed by the processor of the base station 10 according to the embodiment of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, notification of information is not limited to the aspect/embodiment described in the present specification, and may be performed by other methods. For example, the notification of information may be performed by physical layer signaling (for example, DCI (Downlink Control Information), UCI (Uplink Control Information)), upper layer signaling (for example, RRC (Radio Resource Control) signaling, MAC (Medium Access Control) signaling, broadcast information (MIB (Master Information Block), SIB (System Information Block)), other signals, or a combination of these methods. Furthermore, the RRC signaling may be referred to as an RRC message, and may be, for example, an RRC Connection Setup message or an RRC Connection Reconfiguration message, etc.

Each aspect/embodiment described in the present specification may be applied to LTE (Long Term Evolution), LTE-A (LTE-Advanced), SUPER 3G, IMT-Advanced, 4G, 5G, FRA (Future Radio Access), W-CDMA (registered trademark), GSM, (registered trademark), CDMA2000, UMB (Ultra Mobile Broadband), IEEE 802.11 (Wi-Fi), IEEE 802.16 (WiMAX), IEEE 802.20, UWB (Ultra-Wide-Band), Bluetooth (registered trademark), and a system using other appropriate systems and/or a next generation system expanded based on these systems.

In the processes, sequences, and flowcharts, etc., in each aspect/embodiment described in the present specification, the order of processes may be exchanged, as long as there is no inconsistency. For example, for the methods described in the present specification, elements of the various steps are presented in an exemplary order and are not limited to the presented specific order.

The specific operation that is performed by the base station 10 in the present specification may be performed by an upper node of the base station 10 in some cases. It is obvious that in a network including one or more network nodes including the base station 10, various operations performed for communication with the user apparatus UE, may be performed by the base station 10 and/or a network node of other than the base station (for example, MME or S-GW, etc., although not limited as such). In the above example, there is one network node other than the base station 10; however, a combination of a plurality of other network nodes (for example, MME and S-GW) may be used.

Each aspect/embodiment described in the present specification may be used singly or in combination, or may be switched in accordance with execution.

The user apparatus UE may be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

The base station 10 may be referred to, by those skilled in the art, as a NB (Node B), an eNB (enhanced Node B), a Base Station, gNB, or some other suitable term.

The terms "determining" and "deciding" used in the present specification may encompass a wide variety of operations. "Determining" and "deciding" may include the meaning of, for example, judging, calculating, calculating, computing, processing, deriving, investigating, looking up (for example, searching a table, a database, or another data structure), and ascertaining, etc. Furthermore, "determining" and "deciding" may include the meaning of receiving (for example, receiving information), transmitting (for example, transmitting information), inputting, outputting, and accessing (for example, accessing data in a memory). Furthermore, "determining" and "deciding" may include the meaning of resolving, selecting, choosing, establishing, and comparing, etc. In other words, "determining" and "deciding" include the meaning of "determining" and "deciding" some kind of operation.

The phrase "based on" used in the present specification does not mean "based only on", unless explicitly stated otherwise. In other words, the phrase "based on" means both "based only on" and "based on at least".

The terms "include", "including", and variations thereof used in the present specification or claims, are intended to be inclusive in a manner similar to the term "comprising". Furthermore, the term "or" used in the present specification or claims, is not intended to be exclusive OR.

In the entire present disclosure, if articles are added by translation, such as a, an, and the in English, for example, these articles may include a plural number of items/units, unless it is indicated that these articles are obviously not plural from the context.

Although the present invention has been described in detail above, it will be obvious to those skilled in the art that the present invention is not limited to the embodiments described herein. The present invention can be implemented as modifications and variations without departing from the spirit and scope of the present invention as defined by the scope of the claims. Therefore, the description of the present specification is for the purpose of illustration and does not have any restrictive meaning to the present invention.

REFERENCE SIGNS LIST

UE user apparatus
101 transmitting unit
111 message generating unit
121 message transmitting unit
131 signal transmitting unit
102 receiving unit
103 configuration information managing unit
10 base station
201 transmitting unit
202 receiving unit
203 configuration information managing unit
1001 processor
1002 memory
1003 storage
1004 communication device
1005 input device
1006 output device

The invention claimed is:
1. A terminal in a radio communication system supporting a D2D technology, the terminal comprising:
   a processor that generates a message including a first segment and a second segment; and
   a transmitter that transmits the message multiple times within a predetermined period, and a signal used for measuring radio quality, wherein:
information reported by a plurality of the first segments transmitted within the predetermined period by the transmitter, is not changed within the predetermined period, and
a transmitting period of the signal is independent of a transmitting period of the message.

2. The terminal according to claim 1, wherein the transmitter transmits control information including scheduling information of the second segment, or control information including scheduling information of the first segment and the second segment, and the message.

3. The terminal according to claim 1, wherein the transmitter transmits the first segment by using a control channel, and transmits the second segment using a data channel.

4. The terminal according to claim 1, wherein the transmitter transmits, multiple times, the message within the predetermined period, by using a predetermined resource hopping pattern or a resource hopping pattern set from a base station in the radio communication system.

5. The terminal according to claim 1, wherein HARQ soft combining is executed at another terminal, with respect to a plurality of the first segments transmitted within the predetermined period by the transmitter.

6. The terminal according to claim 2, wherein the transmitter transmits the first segment by using a control channel, and transmits the second segment using a data channel.

7. The terminal according to claim 2, wherein the transmitter transmits, multiple times, the message within the predetermined period, by using a predetermined resource hopping pattern or a resource hopping pattern set from a base station in the radio communication system.

8. The terminal according to claim 3, wherein the transmitter transmits, multiple times, the message within the predetermined period, by using a predetermined resource hopping pattern or a resource hopping pattern set from a base station in the radio communication system.

9. The terminal according to claim 2, wherein HARQ soft combining is executed at another terminal, with respect to a plurality of the first segments transmitted within the predetermined period by the transmitter.

10. The terminal according to claim 3, wherein HARQ soft combining is executed at another terminal, with respect to a plurality of the first segments transmitted within the predetermined period by the transmitter.

11. The terminal according to claim 4, wherein HARQ soft combining is executed at another terminal, with respect to a plurality of the first segments transmitted within the predetermined period by the transmitter.

12. A transmission method executed by a terminal in a radio communication system supporting a D2D technology, the transmission method comprising:
generating a message including a first segment and a second segment; and
transmitting, multiple times, the message within a predetermined period, and a signal used for measuring radio quality,
wherein:
information reported by a plurality of the first segments transmitted within the predetermined period at the message transmitting, is not changed within the predetermined period, and
a transmission period of the signal is independent of a transmitting period of the message.

\* \* \* \* \*